United States Patent
Nandi et al.

(10) Patent No.: US 11,299,882 B2
(45) Date of Patent: *Apr. 12, 2022

(54) FOAM INSULATION WITH IMPROVED LOW TEMPERATURE PROPERTIES USING POLYOL ADDITIVES

(71) Applicant: JOHNS MANVILLE, Denver, CO (US)

(72) Inventors: Malay Nandi, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/207,735

(22) Filed: Dec. 3, 2018

(65) Prior Publication Data

US 2020/0173165 A1     Jun. 4, 2020

(51) Int. Cl.
| | |
|---|---|
| *B32B 5/18* | (2006.01) |
| *E04B 1/76* | (2006.01) |
| *E04D 3/35* | (2006.01) |
| *F16L 59/02* | (2006.01) |
| *E04B 1/74* | (2006.01) |

(52) U.S. Cl.
CPC .............. *E04B 1/7608* (2013.01); *B32B 5/18* (2013.01); *E04D 3/351* (2013.01); *F16L 59/029* (2013.01); *B32B 2266/0214* (2013.01); *B32B 2266/06* (2013.01); *B32B 2307/304* (2013.01); *B32B 2307/3065* (2013.01); *B32B 2307/7265* (2013.01); *B32B 2419/06* (2013.01); *E04B 2001/742* (2013.01)

(58) Field of Classification Search
CPC . E04B 1/7608; E04B 2001/742; E04D 3/351; F16L 59/029; B32B 5/18; B32B 2307/304; B32B 2266/06; B32B 2307/3065; B32B 2307/7265; B32B 2419/06; B32B 2266/0214

See application file for complete search history.

(56) References Cited

U.S. PATENT DOCUMENTS

| | | | | |
|---|---|---|---|---|
| 5,317,034 A | * | 5/1994 | Nakamura | C08G 18/161 521/108 |
| 5,391,317 A | * | 2/1995 | Smits | C08J 9/141 252/182.24 |
| 6,086,788 A | * | 7/2000 | Bogdan | C08J 9/0023 252/372 |
| 6,121,338 A | * | 9/2000 | Colman | C08J 9/149 521/131 |
| 6,359,022 B1 | * | 3/2002 | Hickey | C08G 18/4018 252/182.24 |
| 10,525,663 B2 | * | 1/2020 | Nandi | E04B 1/80 |
| 2004/0087674 A1 | * | 5/2004 | Letts | C08G 18/42 521/170 |
| 2006/0052467 A1 | * | 3/2006 | Pignagnoli | C08G 18/281 521/130 |
| 2014/0162006 A1 | * | 6/2014 | Albers | C08G 18/3221 428/36.5 |
| 2014/0220333 A1 | * | 8/2014 | Bogdan | C09D 7/48 428/305.5 |
| 2015/0118476 A1 | * | 4/2015 | Bertucelli | C08G 18/225 428/304.4 |
| 2015/0322194 A1 | * | 11/2015 | Schmidt | C08K 3/04 521/106 |
| 2015/0354211 A1 | * | 12/2015 | Nandi | B32B 5/22 52/232 |

* cited by examiner

*Primary Examiner* — John M Cooney
(74) *Attorney, Agent, or Firm* — Robert D. Touslee

(57) ABSTRACT

A polyisocyanurate foam insulation product is produced from an isocyanate component and a polyol-containing component including a blowing agent. The polyol-containing component comprises one or more polyols, a fire retardant, and a hydroxyl-containing low-molecular-weight additive effective to increase the R-value per inch of the insulation product as measured at 40° F., as compared with an otherwise-identical formulation lacking the hydroxyl-containing low-molecular-weight additive. The polyisocyanurate foam insulation product may have an R-value per inch of at least 6.0 when measured at 40° F. and may have an R-value per inch of at least 5.5 when measured at 25° F. Suitable hydroxyl-containing low-molecular-weight additives may include triethanolamine, trimethylolpropane, N-methyldiethanolamine, 1,4 butanediol, or another suitable multi-functional alcohol or combination of multi-functional alcohols.

40 Claims, 15 Drawing Sheets

FOAM INSULATION WITH IMPROVED LOW TEMPERATURE PROPERTIES USING POLYOL ADDITIVES

CROSS REFERENCE TO RELATED APPLICATIONS

This application is related to U.S. patent application Ser. No. 15/718,728 filed Sep. 28, 2017 and titled "Foam Insulation with Improved Low Temperature Properties", the entire disclosure of which is hereby incorporated by reference herein for all purposes.

BACKGROUND OF THE INVENTION

Polyisocyanurate foam (i.e., PIR board stock) has been widely used to insulate roofs and walls of commercial and industrial buildings for many decades due to its excellent thermal insulation, flame resistance, and mechanical properties. The insulating performance and other performance of polyisocyanurate foams vary based on temperature. For example, FIG. 1 illustrates the insulation performance of a prior polyisocyanurate foam board as a function of temperature. As is apparent, the insulating value of the board peaks at about 65° F., and drops significantly at colder temperatures, and also drops somewhat at higher temperatures.

While polyisocyanurate foams may provide excellent insulation as compared with some other materials, better performance is often desired at lower temperatures.

BRIEF SUMMARY OF THE INVENTION

Embodiments of the present technology may improve the performance of thermal insulation at low temperatures.

According to one aspect, a polyisocyanurate foam insulation product is produced from an isocyanate component and a polyol-containing component including a blowing agent. The polyol-containing component comprises one or more polyols, a fire retardant, and a hydroxyl-containing low-molecular-weight additive. In some embodiments, the hydroxyl-containing low-molecular-weight additive is effective to increase the R-value per inch of the insulation product as measured at 40° F., as compared with an otherwise-identical formulation lacking the hydroxyl-containing low-molecular-weight additive. In some embodiments, the polyisocyanurate foam insulation product has an R-value per inch of at least 6.0 when measured at 40° F. In some embodiments, the polyisocyanurate foam insulation product has an R-value per inch of at least 6.5 when measured at 40° F. In some embodiments, the polyisocyanurate foam insulation product has an R-value per inch of at least 5.5 when measured at 25° F. In some embodiments, the polyisocyanurate foam insulation product has an R-value per inch of at least 6.0 when measured at 25° F. In some embodiments, the hydroxyl-containing low-molecular-weight additive has a molecular weight of between 50 and 500. In some embodiments, the hydroxyl-containing low-molecular-weight additive has a molecular weight of between 50 and 300. In some embodiments, the hydroxyl-containing low-molecular-weight additive is present in the polyol-containing component in an amount from 3 to 20 parts low-molecular-weight additive per 100 parts polyol. In some embodiments, the hydroxyl-containing low-molecular-weight additive is present in the polyol-containing component in an amount from 5 to 10 parts low-molecular-weight additive per 100 parts polyol. In some embodiments, the hydroxyl-containing low-molecular-weight additive is a multi-functional alcohol. In some embodiments, the multi-functional alcohol is selected from the group consisting of aliphatic, cycloaliphatic, aromatic, heterocyclic, and polyhydric alcohols and combinations thereof. In some embodiments, the hydroxyl-containing low-molecular-weight additive comprises triethanolamine (TEA). In some embodiments, the hydroxyl-containing low-molecular-weight additive comprises trimethylolpropane (TMP). In some embodiments, the hydroxyl-containing low-molecular-weight additive comprises diethyl bis(2-hydroxyethyl)aminomethylphosphonate (DEHAMP). In some embodiments, the hydroxyl-containing low-molecular-weight additive comprises N-methyldiethanolamine (MDEA). In some embodiments, the hydroxyl-containing low-molecular-weight additive comprises 1,4 butanediol (BD). In some embodiments, the hydroxyl-containing low-molecular-weight additive comprises isobutanol. In some embodiments, the hydroxyl-containing low-molecular-weight additive comprises diethylethanolamine (DEEA). In some embodiments, the hydroxyl-containing low-molecular-weight additive comprises triethanolamine (TEA) and trimethylolpropane (TMP). In some embodiments, the hydroxyl-containing low-molecular-weight additive comprises triethanolamine (TEA) and sorbitol. In some embodiments, the fire retardant is non-halogenated. In some embodiments, the fire retardant comprises at least one fire retardant selected from the group of fire retardants consisting of diethyl hydroxymethyl phosphonate (DEHMP), and tris(2-chloroisopropyl)phosphate (TCPP). In some embodiments, the fire retardant comprises one or more compounds selected from the group of compounds consisting of an organo-phosphate, an organo-phosphite, and an organo-phosphonate. In some embodiments, the polyisocyanurate foam insulation product is a rigid foam having a density of between 1.45 and 25 lbs/ft$^3$. In some embodiments, the polyisocyanurate foam insulation product has a cell size less than of less than 200 microns. In some embodiments, the polyisocyanurate foam insulation product has a cell size less than of less than 150 microns. In some embodiments, the polyisocyanurate foam insulation product has a cell size less than of less than 120 microns. In some embodiments, the polyol-containing component has, before the addition of the blowing agent, a viscosity of less than 3000 centipoise (cps). In some embodiments, the polyol-containing component has, before the addition of the blowing agent, a viscosity of less than 2800 centipoise (cps). In some embodiments, the polyol-containing component has, before the addition of the blowing agent, a viscosity of less than 2500 centipoise (cps). In some embodiments, the polyol-containing component has, before the addition of the blowing agent, a viscosity of less than 2000 centipoise (cps). In some embodiments, the polyol-containing component comprises a multi-functional polyether, polyester, or polycarbonate polyol having a hydroxyl number between 25 and 500. In some embodiments, the blowing agent comprises a mixture of n-pentane and isopentane. In some embodiments, the blowing agent comprises water in an amount between 0.1 and 1.0 weight percent of the polyol-containing component. In some embodiments, the polyisocyanurate foam insulation product further comprises a catalyst and a surfactant.

According to another aspect, an insulated structure comprises a plurality of structural support members coupled together to form a frame, and a plurality of polyisocyanurate foam insulation boards attached to an exterior side of the frame to form an insulation layer. Each of the plurality of polyisocyanurate foam insulation boards comprises a polyisocyanurate core produced from an isocyanate component, and a polyol-containing component including a blowing agent. The polyol-containing component comprises one or more polyols, a fire retardant, and a hydroxyl-containing low-molecular-weight additive. The polyisocyanurate foam insulation product has an R-value per inch of at least 6.0 when measured at 40° F. In some embodiments, the hydroxyl-containing low-molecular-weight additive is effective to increase the R-value per inch of the insulation product as measured at 40° F., as compared with an otherwise-identical formulation lacking the hydroxyl-containing low-molecular-weight additive.

According to another aspect, a roof system comprises a structural deck positioned atop joists or other support members of the roof system, a plurality of polyisocyanurate foam insulation boards positioned atop the structural deck to form an insulation layer for the roof system, and a waterproof membrane positioned atop the plurality of polyisocyanurate foam insulation boards to form a waterproof layer for the roof system. Each of the plurality of polyisocyanurate foam insulation boards includes a polyisocyanurate core produced from an isocyanate component and a polyol-containing component including a blowing agent. The polyol-containing component comprises one or more polyols, a fire retardant, and a hydroxyl-containing low-molecular-weight additive. The polyisocyanurate foam insulation product has an R-value per inch of at least 6.0 when measured at 40° F. In some embodiments, the hydroxyl-containing low-molecular-weight additive is effective to increase the R-value per inch of the insulation product as measured at 40° F., as compared with an otherwise-identical formulation lacking the hydroxyl-containing low-molecular-weight additive. In some embodiments, the roof system further comprises a plurality of polyisocyanurate foam cover boards positioned atop the plurality of polyisocyanurate foam insulation boards.

According to another aspect, a board has a polyisocyanurate foam core produced from an isocyanate component and a polyol-containing component including a blowing agent. The polyol-containing component comprises one or more polyols, a fire retardant, and a hydroxyl-containing low-molecular-weight additive. In some embodiments, the hydroxyl-containing low-molecular-weight additive is effective to increase the R-value per inch of the insulation product as measured at 40° F., as compared with an otherwise-identical formulation lacking the hydroxyl-containing low-molecular-weight additive. In some embodiments, the board further comprises a facer on one major surface of the board. In some embodiments, the facer comprises foil. In some embodiments, the facer comprises fiberglass. In some embodiments, the foam core has a density of between 1.45 and 25 lbs/ft$^3$. In some embodiments, the foam core has a density of between 4 and 8 lbs/ft$^3$. In some embodiments, the foam core has a density of between 1.5 and 2 lbs/ft$^3$. In some embodiments, the foam core has a density of between 1.5 and 2.5 lbs/ft$^3$. In some embodiments, the foam core has an R-value per inch of at least 6.0 when measured at 40° F. In some embodiments, the foam core has an R-value per inch of at least 6.5 when measured at 40° F. In some embodiments, the foam core has an R-value per inch of at least 5.5 when measured at 25° F. In some embodiments, the foam core has an R-value per inch of at least 6.0 when measured at 25° F.

DETAILED DESCRIPTION OF THE INVENTION

Figure 1:
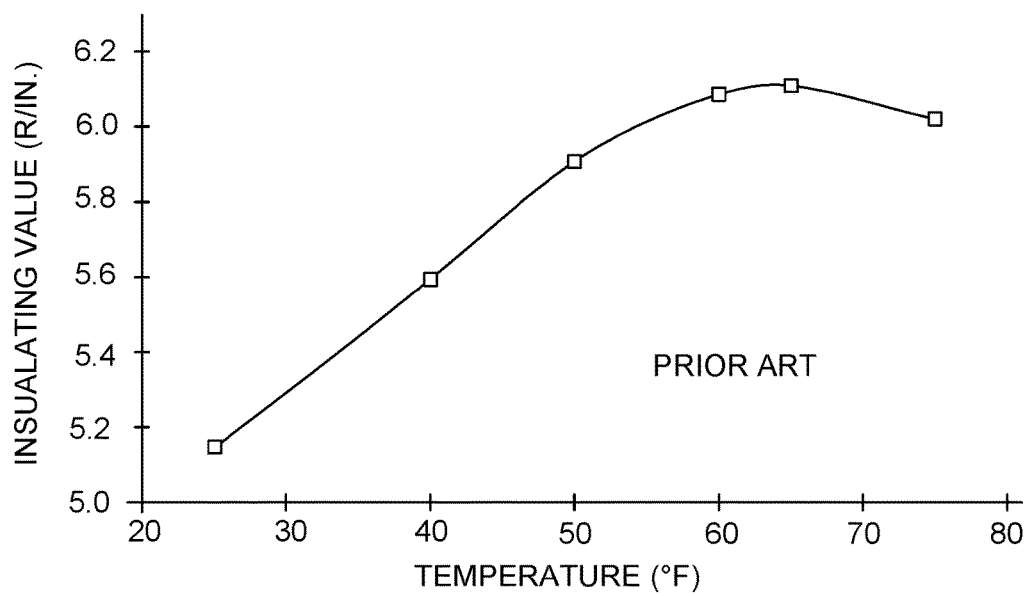
FIG. 1 illustrates the insulation performance of a prior polyisocyanurate foam board as a function of temperature.

Polyisocyanurate foams, also called "polyiso" foams may be made by combining separate liquid mixtures that include the polyisocyanates (the A-side mixture) and the polyols (the B-side mixture). The A-side mixture and B-side mixture mix together to form the polyiso foam product. A blowing agent is used, typically in the B-side mixture, to cause the foaming of the formulation, creating a cellular structure having good insulating properties. A common blowing agent comprises pentane.

Several different characteristics are desirable in polyiso boards used for building insulation or other applications. Of course, a high insulating value is desired, for reducing energy consumption and providing comfort in the building. The insulation boards should be strong enough to withstand handling and usage without significant damage, during construction and after. It is preferable that the insulation boards be light weight, to minimize the cost of the raw materials used to make the boards. In addition, it is desirable that the viscosity of the B-side mixture be low, to facilitate processing of the formulation during board manufacturing. These may be competing goals.

The reduction in insulating value at low temperatures is an unusual characteristic, which may be unique to polyiso boards. One mechanism of the reduction is believed to be condensation of residual blowing agent within the cells of the foam.

Methods have been explored for raising the low temperature performance of polyisocyanurate insulation, for example by changing the blowing agent used in making the insulation as described in U.S. Patent Application Publication No. 2018/0282998, the entire disclosure of which is hereby incorporated by reference herein for all purposes. A blowing agent or combination of blowing agents having a lower boiling point (i.e. a lower condensation temperature) may result in less condensation, and may permit the insulation to maintain better insulating properties at lower temperatures as compared with an insulation made with a higher-boiling-point blowing agent.

However, other methods are still desired for improving the low-temperature performance of polyiso insulation. In some embodiments, as is discussed below, a polyol having a higher functionality may improve the R-value of the resulting insulation across its temperature range, as compared with a lower-functionality polyol.

While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of an isocyanurate ring from the trimerization of three generic diisocyanate molecules:

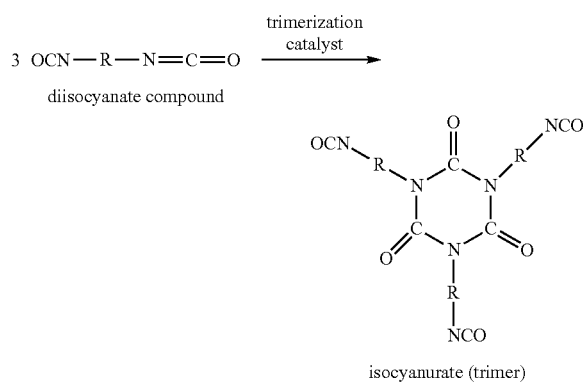

The polyisocyanate reactants (e.g., diisocyanate reactants) still leave active isocyanate groups on the isocyanurate ring after trimerization which can react with additional polyisocyanurate reactants and the polyol reactants. The isocyanurate rings react with the polyols to form a cross-linked polyisocyanurate polymer. When the polyisocyanurate polymer is formed with the help of a blowing agent, it forms a PIR foam. The presence of the isocyanurate rings in the molecular structure of a PIR foam normally imparts greater stiffness and higher resistance to chemical and thermal breakdown compared with polyurethane foams.

Because a distinguishing characteristic of the PIR formation is the trimerization of the isocyanate reactant to form isocyanurate rings, PIR formulations generally have a larger molar portion of the polyisocyanate to polyol, and include polyisocyanate trimerization catalysts. In many instances, the polyols used in the formulations are also different.

The A-side mixture may include one or more polyisocyanate compounds. Example polyisocyanates may include substituted or unsubstituted polyisocyanates, and may more specifically include aromatic, aliphatic, and cycloaliphatic polyisocyanates having at least two isocyanate functional groups. Specific example aromatic polyisocyanates include 4,4'-diphenylmethane diisocyanate (MDI), polymeric MDI (PMDI), toluene diisocyanate, and allophanate modified isocyanate. A commercial example of a isocyanate formulation that may be used in the present formulations is Wannate® PM-700 manufactured by Wanhua Chemical Group Co., Ltd. of Yantai, China. This isocyanate formulation may have a viscosity of about 600 mPa-S at 25° C., a functionality of about 2.9, and an isocyanate content of about 30.4%.

The B-side mixture of the polyiso foam may include one or more polyol compounds. The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

Example polyols may include polyether polyols, polyester polyols, polycarbonate polyols, aromatic polyols (including polyester polyols, PET-based polyols, and polyamide-based polyols), and mannich polyols. Polyether polyols may be made by polymerizing one or more types of epoxides, such as ethylene oxide or propylene oxide. The may also be made by polymerizing the epoxide with a polyol such as a diol (e.g., glycol), triol (e.g., glycerin), or other polyol. Example polyether polyols may include polyether diols such as polyether polyethylene glycol, polypropylene glycol, and poly(tetramethylene ether) glycol, among other polyether diols.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Invista, including Terate® HT 5503 and Terate® HT 5349. Terate® HT 5503 may have a hydroxyl number between 224 and 245, and a functionality of about 2.0. Terate® HT 5349 may have a hydroxyl number between 295 and 315, and a functionality of about 2.45. The polyols used may be only polyester polyols and may exclude other polyols.

Polycarbonate polyols are a special class of polyester polyol, which can be produced through polycondensation of diols with phosgene or transesterification of diols, such as hexane diol, with carbonic acid ester. Polycarbonate polyols may be produced from propylene oxide and carbon dioxide blended with dibasic ester under catalytic condition. The carbon dioxide may account for approximately 40% of the polyol mass. The polyol may have a functionality of about 2.0 and may have hydroxyl number of about 72. Commercial available polycarbonate polyols include Converge® Polyol sold by Novomer, now Saudi Aramco. The polycarbonate polyol may be used as blend with polyester polyol such as Terate® HT 5503.

Catalysts used in polyisocyanurate foam formulations normally include trimerization catalysts that catalyze the formation of cyclic isocyanurate trimers from the polyisocyanate reactant. Example trimerization catalysts include tertiary amines, such as 1,3,5-tris(3-(dimethylamino)propyl)-hexahydro-triazine and quaternary ammonium salts, such DABCO-TMR and DABCO-TMR2 sold by AirProducts, now Evonik. Example catalysts may also include metal catalysts, such as potassium octoate and potassium acetate. Example catalysts that may be useful in embodiments of the invention include OMG977™ and OMG 1123™ catalysts sold by Borchers OM Group, and TMR-20™ catalyst sold by Evonik. Quaternary ammonium salts, such as TMR™ or TMR2™, and metal catalysts, such as TMR-20™, are particularly effective in promoting trimer formation at high index.

The present polyisocyanurate formulations may also include one or more surfactants. The surfactants function to improve compatibility of the formulation components and stabilize the cell structure during foaming. Example surfactants can include organic or silicone based materials, or non-silicone materials. Example surfactants that may be useful in embodiments of the invention include Vorasurf™ sold by The Dow Chemical Company and DC 193 sold by Dow Corning Company.

The present polyisocyanurate formulations may also include the non-halogenated and/or halogenated fire retardants. In some embodiments, the polyisocyanurate formulation may include a halogenated fire retardant such as tris(2-chloroisopropyl) phosphate (TCPP). In some embodiments, a non-halogenated fire retardant may include a non-halogenated fire retardant such as diethyl hydroxylmethyl phosphonate (DEHMP). The non-halogenated fire retardant may reduce the amount of halogenated fire retardants such as TCPP use in the foams. The polyisocyanurate core may be able to form a sufficiently stable char when exposed to flame conditions in accordance with ASTM E-84. The stable char enables the polyisocyanurate core to pass the ASTM E-84 test. The polyisocyanurate foam insulation boards may exhibit an ASTM E1354-11b performance that is equivalent with or better than a similar polyisocyanurate foam insulation board having a halogenated fire retardant tris(2-chloroisopropyl) phosphate (TCPP) or without a non-halogenated fire retardant.

The phosphorus containing non-halogenated fire retardant may include: an organo-phosphate, an organo-phosphite, and/or an organo-phosphonate. The non-halogenated organo phosphorus fire retardant could be non-reactive or reactive, i.e. containing isocyanate reactive functionality. An example non-reactive organa phosphorus fire retardant is a blend of butyl diphenyl phosphate, dibutyl phenyl phosphate, and triphenyl phosphate. Example reactive organa phosphorus fire retardants include diethyl hydroxylmethyl phosphonate (DEHMP) and diethyl N,N-bis(2-hydroxyethyl)aminomethylphosphonate (DEHAMP, also known as Fyrol 6) sold by ICL and Lanxess. In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

Select embodiments of the present polyisocyanurate formulations may further include one or more of initiators and carbohydrates. Unlike catalysts, an initiator is consumed during the polymerization reaction and becomes part of the polyiso foam product. Example initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others. A carbohydrate may include a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all.

The blowing agents used to make the foam may include hydrocarbon gas (e.g., n-pentane, isopentane, cyclo-pentane, etc.) and/or fluorocarbon gas, among others. The blowing agent may include a mixture of isopentane and n-pentane. Specific examples of fluorocarbon gases may include HFC-245fa (i.e., 1,1,1,3,3-pentafluoropropane) commercially available under the tradename Enovate® from Honeywell Corp., HFC-365mfc (i.e., $CF_3CH_2CF_2CH_3$), HFC-134a (i.e., 1,1,1,2-tetrafluoroethane), HCFO 1233zd (i.e., trans-1-chloro-3,3,3-trifluoropropene) sold under tradname Solstice® LBA by Honeywell Corp., Forane® 1233zd by Arkema, and HFO-1336mzz (1,1,1,4,4,4-hexafluoro-2-butene) sold under trade name Opteon 1100 by Chemours. The blowing agent may be in the B-side mixture. In some embodiments, the blowing agent is a 50/50 mixture of n-pentane and isopentane.

In some embodiments, water may react with isocyanate in the mixture to generate carbon dioxide, which acts as a blowing agent.

The B-side mixture may also include an emulsifier.

An example formulation for a polyiso foam insulation may have an isocyanate index greater than about 2.50, including from 2.50 to 2.70 and from 2.70 to 3.50. When a polyisocyanate reacts with a polyol to form a urethane bond, one NCO group reacts with one OH group. As is known in the art, the index is defined as the ratio of NCO group to OH group as shown in the formula below:

$$\text{Index} = \frac{\text{Moles of NCO group}}{\text{Moles of OH group}}$$

When the number of NCO groups equals the number of OH groups in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 2.50 and 2.70, provides at least a 2:1 ratio of NCO groups to OH groups, which has been found to provide an appreciable combination of structure integrity, thermal strength and/or stability, and fire resistance. Some embodiments may have an isocyanate index of at least 3.0, for example about 3.25.

A polyiso formulation embodying the invention may also have a metallo-organic compound as part of its B-side mixture. For example a compound of zinc or bismuth with various coordinating organic ligands may be used, and may impart favorable properties to the resulting foam. An example of an additive including a zinc compound and usable in embodiments of the invention is KKAT®XK-614 Zinc complex available from King Industries, Inc. USA. An example of a bismuth additive usable in embodiments of the invention is KKAT®-XC-C227 Bismuth complex, 2-ethylhexanoic acid (CAS 149-57-5) also sold by King Industries, Inc. USA. In some embodiments, the metallo-organic compound may include carbon, and may be for example a zinc salt such as a zinc carboxylate. In some embodiments, the metallo-organic compound may be about 0.1 to 1.0 weight percent of the B-side mixture.

Figure 2:
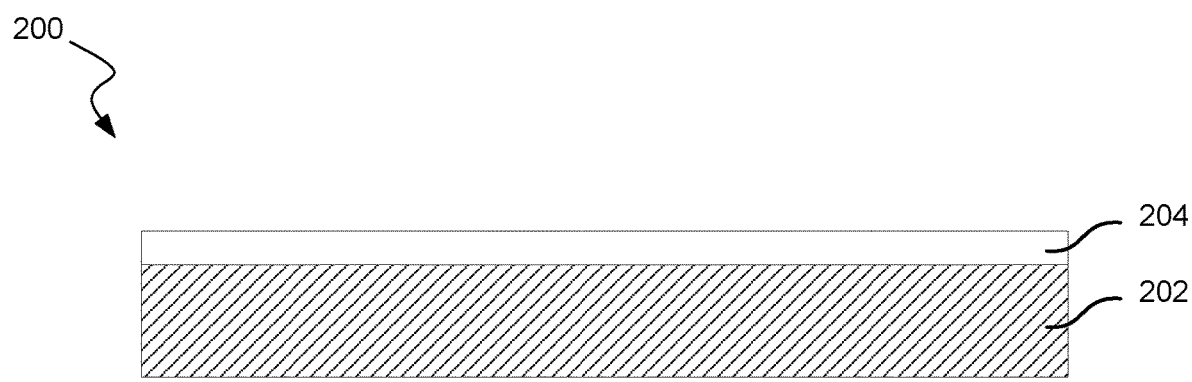
FIG. 2 illustrates an embodiment of a polyisocyanurate foam board.

Referring now to FIG. 2, illustrated is an embodiment of a polyisocyanurate foam board 200 (hereinafter foam board 200). The foam board 200 includes a polyisocyanurate core 202 that is produced from an isocyanate, a polyol, and a blowing agent in accordance with embodiments of the invention. The polyisocyanurate core 202 typically has an average foam cell size of less than about 200 microns, and more commonly between about 100-150. In contrast, conventional foam boards typically have an average foam cell size of between about 200 and 300. The smaller foam cell size of the polyisocyanurate core 202 may enable the core to exhibit an increased R-value when compared with conventional cores. In some embodiments, a polyisocyanurate foam preferably has a cell size of less than 120 microns.

R-values herein are measured according to ASTM standard test method C518.

In some embodiments, the polyisocyanurate core 202 may include between 1 and 10 weight percent of a hydrocarbon blowing agent, such as any blowing agent described herein. In an example embodiment, the polyisocyanurate core 202 may include between 5 and 8 weight percent of the hydrocarbon blowing agent. The weight percent of the hydrocarbon blowing agent typically corresponds with the foam density of the polyisocyanurate core 202 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot (lbs/ft$^3$), commonly have 5% or more of a hydrocarbon blowing agent by weight, and more commonly between about 6 and 7 weight percent. In contrast, roofing cover boards that have a density of up to 10 lbs/ft$^3$, and more commonly between 4 and 7 lbs/ft$^3$, commonly have less than 5% of a hydrocarbon blowing agent by weight, and more commonly between about 1.5 and 3 weight percent.

The foam insulation board may have different densities. For example, a lower density foam insulation board may have a density of between about 1.5 and 2.5 lbs/ft$^3$, including between about 1.6 and 1.8 lbs/ft$^3$. A higher density foam cover board may have a foam density of up to 12 lbs/ft$^3$, including between about 6 and 7 lbs/ft$^3$. For insulation purposes, a foam insulation board in accordance with embodiments of the invention preferably has a density of less than 2.0 lbs/ft$^3$, and more preferably less than 1.7 lbs/ft$^3$, and even more preferably less than 1.61 lbs/ft$^3$.

Foam board 200 also includes an optional facer material 204 that is applied to at least one surface of the polyisocyanurate core 202. The facer material 204 typically includes a glass fiber mat, but may include other types of facer materials. The facer material 204 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 204 may include a mineral and/or pigment based coating with high solid content to provide one or more desired characteristics, such as low porosity, fire retardancy, mechanical strength, and the like. The facer 204 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 204 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 204 may have a thickness of between about 0.006 and 1.2 mm. The thickness of 0.006 mm typically represents the thickness of a metal facer while the 1.2 mm represents the thickness of other facers.

Although FIG. 2 shows the facer 204 being positioned on a single side of the polyisocyanurate core 202, it should be realized that in many embodiments an additional facer may be positioned on the opposite side of the polyisocyanurate core 202. The additional facer may be a similar or different facer than facer 204 and/or may have a different thickness and/or material coating as desired.

The polyisocyanurate foam board 200 commonly has a density of between about 1.45 and 25 lbs/ft$^3$, and more commonly between 1.5 and 7.5 lbs/ft$^3$. In an example embodiment, a polyisocyanurate foam cover board may have a density of between about 4 and 8 lbs/ft$^3$, and more commonly between about 6 and 7 lbs/ft$^3$; a polyisocyanurate foam insulation roofing board may have a density of between about 1.5 and 2.0 lbs/ft$^3$, and more commonly between about 1.6 and 1.7 lbs/ft$^3$; and a polyisocyanurate foam sheathing board may have a density of between about 1.5 and 2.5 lbs/ft$^3$, and more commonly between about 1.6 and 2.0 lbs/ft$^3$.

Figure 3:
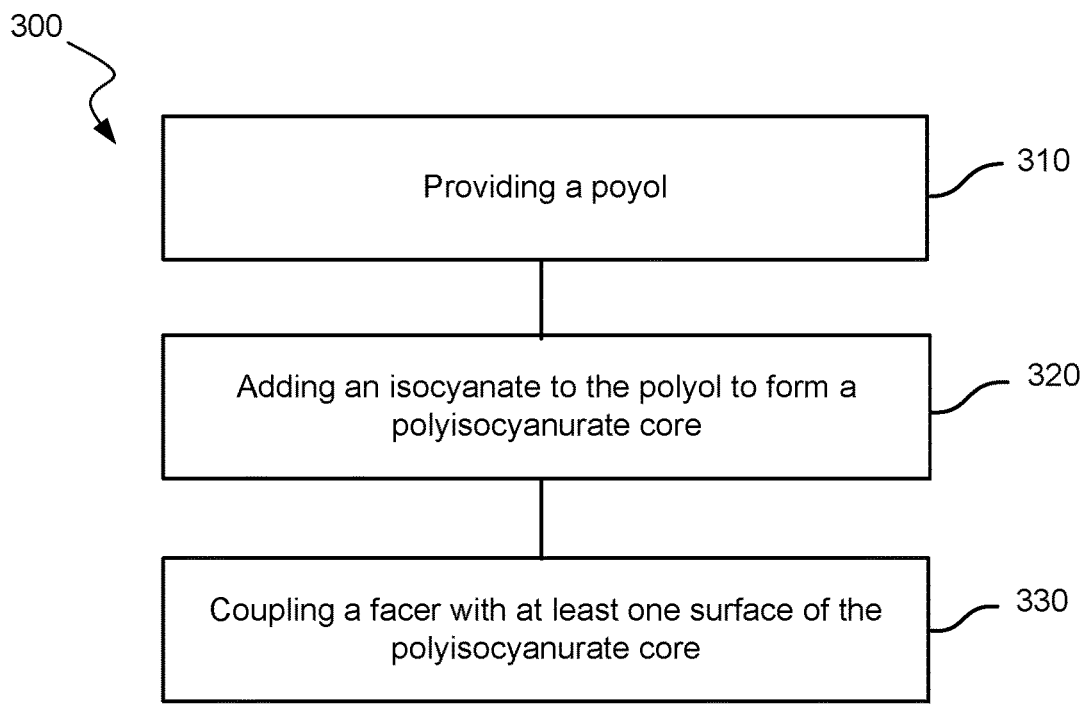
FIG. 3 illustrates is a method of forming a polyisocyanurate foam board, in accordance with embodiments of the invention.

Referring now to FIG. 3, illustrated is a method of forming a polyisocyanurate foam board. At block 310, a polyol is provided. At block 320, an isocyanate is added to the polyol to form a polyisocyanurate core having an isocyanate index greater than about 2.00. A fire retardant may be added the polyisocyanurate core. At block 330, a facer material is coupled with at least one surface of the polyisocyanurate core. The facer material includes a glass fiber mat, or other mat, that may be selected based on the end application of the polyisocyanurate foam board as described herein. In some embodiments, an additional facer material may be coupled with an opposite surface of the polyisocyanurate core.

The resulting polyisocyanurate core may have an R-value as described herein. In some embodiments, the method may also include adding between 1 and 10 weight percent of a hydrocarbon blowing agent to the polyisocyanurate core.

Example Foam Formulations

An example formulation prepared in accordance with embodiments of the invention in a small batch is as shown in Tables 1 and 2 below, and is designated Example 1.

TABLE 1

Example 1 B-Side

| B-Side Formulation Ingredient | Wt (lb) | Parts | Batch Wt % |
|---|---|---|---|
| Invista HT5503 | 39.7 | 50 | 32.4 |
| Invista HT5349 | 39.7 | 50 | 32.4 |
| DEHMP | 13.5 | 17 | 11.0 |
| Vorasurf 504 | 2.4 | 3 | 1.9 |
| TMR 20 | 1.4 | 1.8 | 1.2 |
| KKAT ®XK-614 (Zinc) | 0.5 | .6 | 0.4 |
| OMG 977 (k-oct) | 4.6 | 5.8 | 3.8 |
| OMG 1123 (K-Ace) | 0.5 | 0.6 | 0.4 |
| Water | 0.3 | 0.40 | 0.3 |
| Pentane 50/50 i/n | 19.9 | 25.1 | 16.3 |
| Total "B" | 122.5 | 154.3 | 100.0 |

TABLE 2

Example 1 A-Side

| A-Side Formulation Ingredient | Wt (lb) | Parts | Batch Wt % |
|---|---|---|---|
| Yantai Wannate PM-700 | 227.5 | 286.56 | 100.0 |
| Total "A" | 227.5 | 286.56 | 100.0 |

Figure 4:
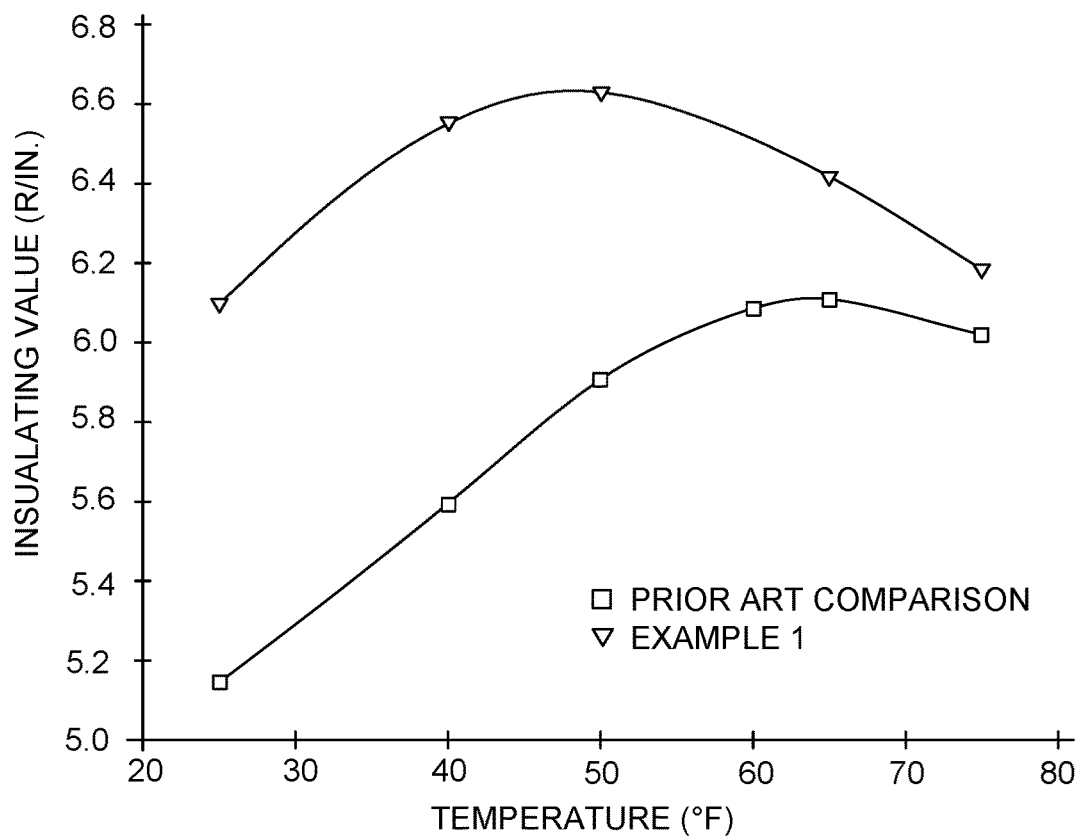
FIG. 4 shows the thermal performance of a board in accordance with embodiments of the invention, as compared with a prior art formulation.

The thermal performance of a board made from the Example 1 formulation is shown in FIG. 4, superimposed with the prior art formulation performance data copied from FIG. 1. The foam of the new formulation shown in FIG. 4 had a density of 1.61 lb/ft³, an index of 3.25, and a cell size of 113 microns. As is apparent, the insulating value of Example 1 is significantly improved over the performance of the prior art control sample at all temperatures in the tested range, but especially at lower temperatures. In addition, the peak R-value is surprisingly shifted from about 67° F. to about 48° F.

Table 3 below gives the formulations for the B-side mixture of Example 1 and other example embodiments. All of these examples used a blowing agent having a 50/50 mixture of n-pentane and isopentane.

TABLE 3

| Example Number | Polyol Used | Fire Retardant Used | Metallo-Organic Component | Cell Size (microns) | Index |
|---|---|---|---|---|---|
| 1 | HT 5503 HT 5349 | DEHMP | KKAT ®XK-614 (Zinc) | 113 | 3.25 |
| 2 | HT 5503 | DEHMP | None | 165 | 3.25 |
| 3 | HT 5503 | TCPP | None | 173 | 3.25 |
| 4 | HT 5503 HT 5349 | DEHMP | None | 130 | 3.25 |
| 5 | HT 5503 | DEHMP | KKAT ®XK-614 (Zinc) | 157 | 3.5 |
| 6 | HT 5503 | DEHMP | None | 150 | 3.5 |
| 7 | HT 5503 | DEHMP | KKAT ®XK-614 (Zinc) | 158 | 3.25 |
| 8 | HT 5503 | TCPP | KKAT ®XK-614 (Zinc) | 182 | 3.25 |

Table 4 gives the performance data for a number of example formulations in numerical form, including the prior art comparative example shown in FIG. 1 and Example 1 described above. Each of the tested samples was 2 inches thick and included a glass-reinforced paper facer.

TABLE 4

| Example Number | R/in. at 25° F. | R/in. at 40° F. | R/in. at 50° F. | R/in. at 60° F. | R/in. at 65° F. | R/in. at 75° F. |
|---|---|---|---|---|---|---|
| Comparative | 5.144 | 5.593 | 5.907 | 6.086 | 6.109 | 6.020 |
| 1 | 6.097 | 6.555 | 6.627 | | 6.418 | 6.184 |
| 2 | 5.537 | 6.044 | 6.243 | 6.257 | | 6.001 |
| 3 | 5.155 | 5.717 | 6.017 | 6.130 | 6.106 | 5.933 |
| 4 | 5.909 | 6.405 | 6.538 | 6.479 | 6.388 | 6.162 |
| 5 | 5.785 | 6.270 | 6.383 | 6.299 | 6.198 | 5.977 |
| 6 | 5.422 | 5.958 | 6.162 | 6.186 | 6.117 | 5.911 |
| 7 | 5.708 | 6.157 | 6.282 | 6.249 | 6.171 | 5.957 |
| 8 | 5.277 | 5.854 | 6.155 | 6.268 | 6.247 | 6.077 |

Figure 5:
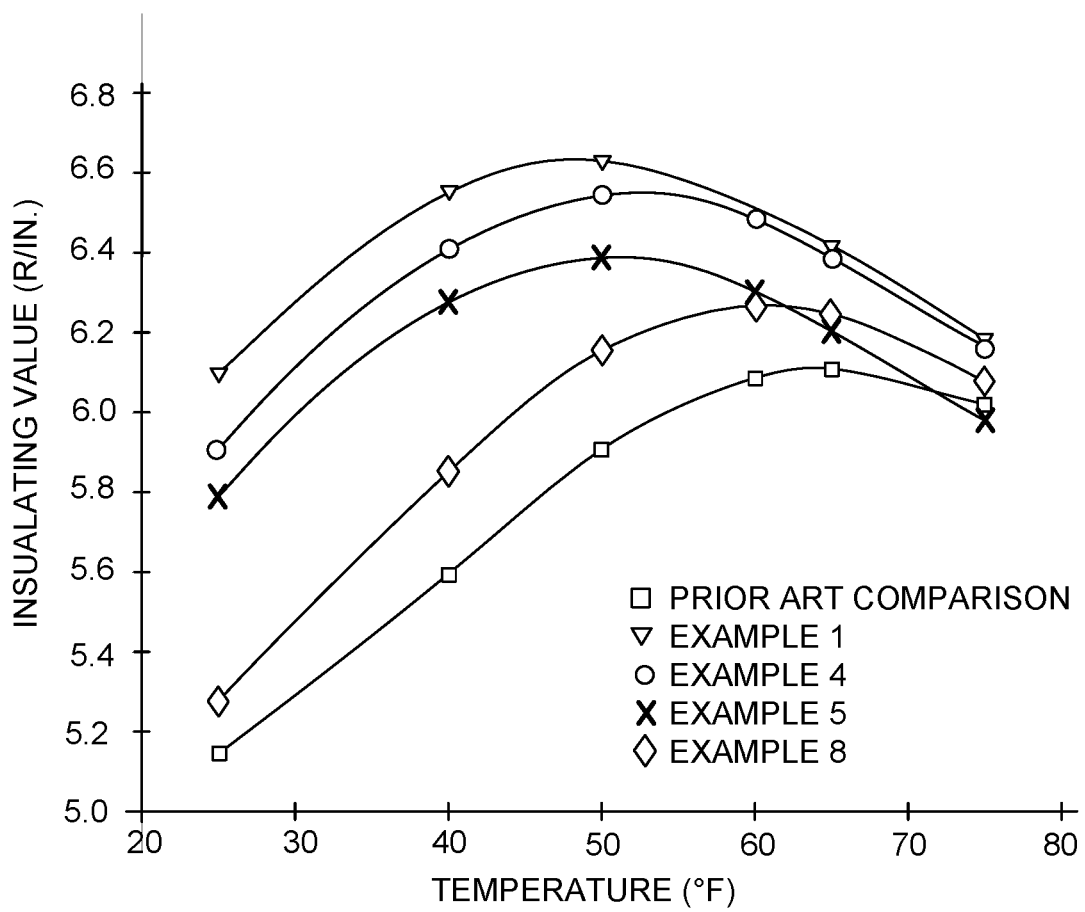
FIG. 5 graphically illustrates the thermal performance of several polyisocyanurate formulations, as compared with a prior art formulation.

All of the embodiments listed in Table 4 exhibit improved thermal performance across some or all of the tested temperature range, as compared with the prior art comparative sample. FIG. 5 graphically illustrates the thermal performance of Examples 1, 4, 5, and 8, which encompass several different formulations and exhibit significant improvements over the prior art. The improvements were obtained without changes in the blowing agent. The prior art comparative sample included TCPP as a fire retardant and one di-functional polyester polyol, and had an index of about 2.60. The prior art formulation did not include a zinc complex.

In general, polyisocyanurate foam formulations in accordance with embodiments of the invention may include any one or more components in the amounts shown in Table 5 below.

TABLE 5

| Component | B-Side wt % | Preferred B-Side wt % | More preferred B-Side wt % |
|---|---|---|---|
| Polyol(s) | 70-90 | 75-85 | 79-81 |
| Fire retardant(s) | 5-15 | 8-13 | 10-12 |
| Surfactant(s) | 0.5-4 | 1-3 | 1.5-2.5 |
| Catalyst(s) | 2-10 | 4-8 | 5-6 |
| Water | 0.1-1.0 | 0.15-0.8 | 0.2-0.7 |
| Metallo-organic compound(s) | 0.1-10 | 0.2-5 | 0.3-1.0 |

Example Wall Systems or Insulated Structures

Wall structures or systems of commercial and residential structures are commonly insulated by filling a wall cavity that is positioned between wall studs (wood or metal). The wall cavity may be filled using a spray foam insulation, batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 6:
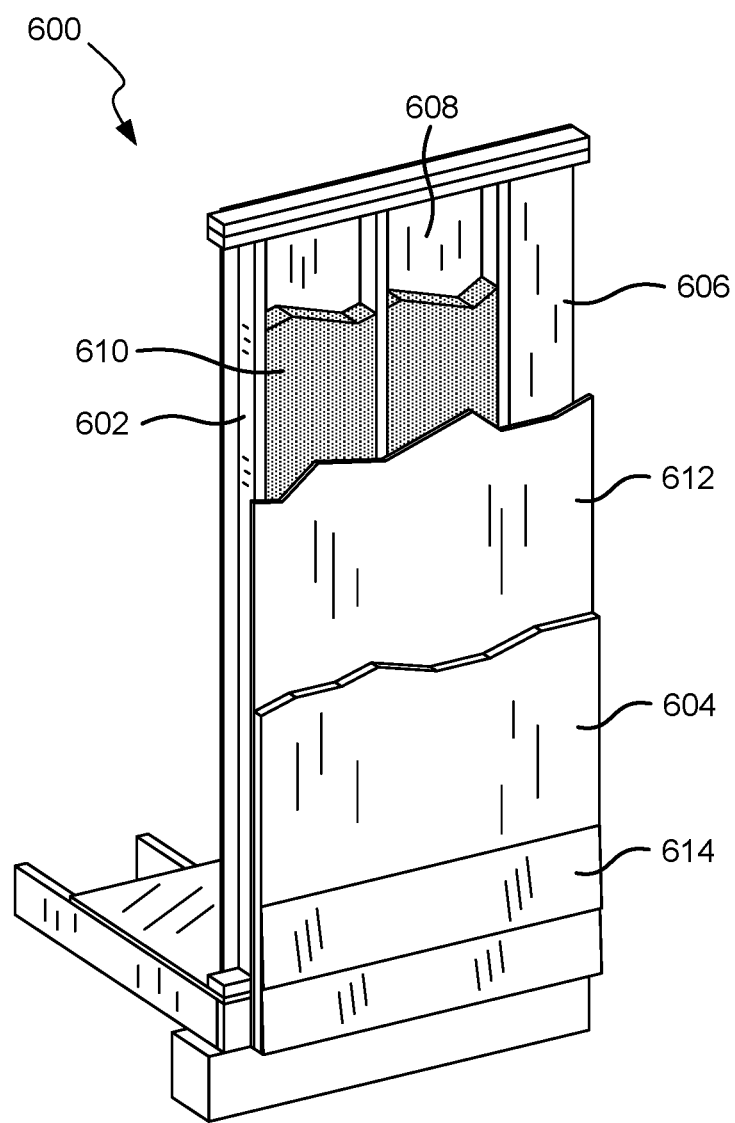
FIG. 6 illustrates a wall system or structure in accordance with embodiments of the invention.

Referring now to FIG. 6, illustrated is an embodiment of a wall system or structure 600 that may be used to insulate a commercial or residential structure. Wall system 600 includes a plurality of structural support members or wall studs 602 that are coupled together to form a wall frame. A plurality of foam boards 604 (hereinafter sheathing boards 604) are attached to an exterior side of the frame to form an insulative exterior wall or surface of the wall system 600 (i.e., continuous external sheathing insulation). A plurality of wall boards 606 are attached to an interior side of the frame opposite the sheathing boards 604 to form an interior wall or surface of the wall system 600. Example wall boards 606 include gypsum boards and the like. The wall studs 602, sheathing boards 604, and wall boards 606 define a plurality of wall cavities 608.

Fasteners (not shown) are used to attach the sheathing boards 604 and wall boards 606 to the respective sides of the frame. Each fastener may include an elongate shaft that penetrates through a respective board and into a wall stud 602 to couple the components together. Example fasteners include nails and screws, although in some embodiments non-mechanical fasteners may be used, such as adhesives and the like. An insulation material 610 is positioned within at least one of the wall cavities 608 of the wall system, and more commonly within each wall cavity 608 or within most of the wall cavities. The insulation material 610 is positioned within the wall cavity 608 to insulate the building or structure. As described herein, example insulation materials include spray foam insulation (open cell and/or close cell), batt or roll insulation (e.g., fiberglass, mineral wool, cotton, and the like), loose fill insulation (e.g., fiberglass, cellulose, mineral wool, and the like), or a combination thereof. The spray foam insulation may be any spray foam insulation described herein.

In some embodiments, an additional wall board 612 may be attached to the exterior side of the frame. In some embodiments, the additional wall board 612 may be free of a halogenated fire retardant. The additional wall board 612 may be a gypsum board, cement board, oriented strand board (OSB), plywood, and the like. Wall board 612 may be positioned between the sheathing board 604 and frame or wall studs 602 for structural support and/or other purposes. External veneer or cladding 614 (hereinafter exterior cladding 614) may be positioned on an exterior side of the sheathing boards 604. In some embodiments, the exterior cladding 614 may be free of a halogenated fire retardant. The exterior cladding 614 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 614 and the sheathing boards 604. The wall system 600 may also include other components, layers, and/or materials that are not shown, such as an interior vapor barrier, flashing, primer, and the like.

As described herein, the sheathing board 604 of wall system 600 include a polyisocyanurate core that is produced from: an isocyanate, a polyol, and a blowing agent. The polyisocyanurate core has an R-value per inch of at least 5.7 when measured at 40° F. The polyisocyanurate core may be any core described herein.

In some embodiments, the sheathing board 604 may also include a foil facer that is attached to an exterior side of the board. The sheathing boards 604 may have a foam density of between about 1.5 and 2.5 lbs/ft$^3$, and more commonly between about 1.6 and 2.0 lbs/ft$^3$. In some embodiments, the polyisocyanurate core also include between 1 and 10 weight percent of a hydrocarbon blowing agent. The sheathing board more commonly include between about 5 and 8 weight percent of the hydrocarbon blowing agent. The sheathing board may be any foam board described herein.

Figure 7:
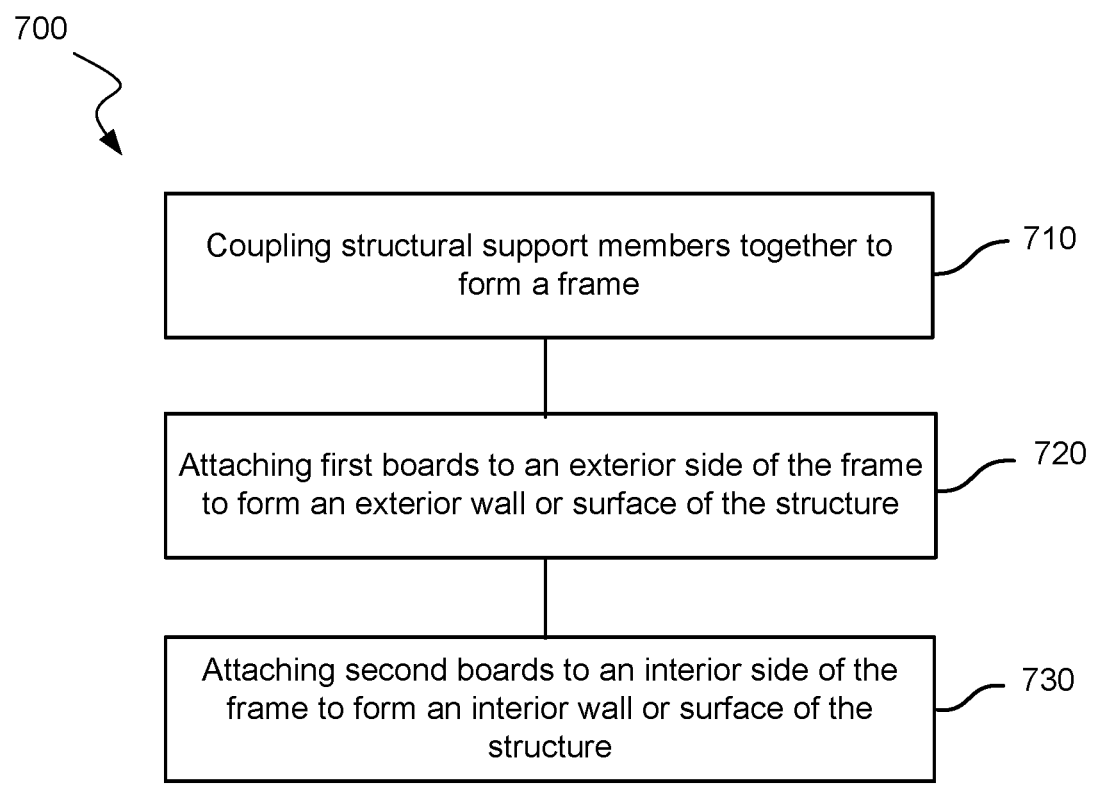
FIG. 7 illustrates a method of forming a wall of a structure in accordance with embodiments of the invention.

Referring now to FIG. 7, illustrated is a method of forming a wall of a structure. At block 710, a plurality of structural support members (i.e., wall studs) are coupled together to form a frame. At block 720, a plurality of first boards (i.e., foam boards or polyisocyanurate sheathing boards) are attached to an exterior side of the frame to form an insulative exterior wall or surface. At block 730, a plurality of second boards (i.e., wall boards) are attached to an interior side of the frame to form an interior wall or surface. The structural support members, foam boards, and wall boards are coupled together to define a plurality of wall cavities. An insulation material (e.g., a spray foam material, a fiberglass material, or a combination thereof) may be positioned within at least one of the wall cavities, and commonly most or all wall cavities, to insulate an interior space of the structure.

As described herein, at least one of the foam boards includes a polyisocyanurate core that is produced from an isocyanate, a polyol, and a blowing agent.

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core. Preferably, the polyisocyanurate core has an R-value per inch of at least 5.7 when measured at 40° F.

Wall systems may include those described in U.S. application Ser. No. 14/299,571, now U.S. Pat. No. 9,523,195, which is incorporated herein by reference for all purposes.

Example Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 8:
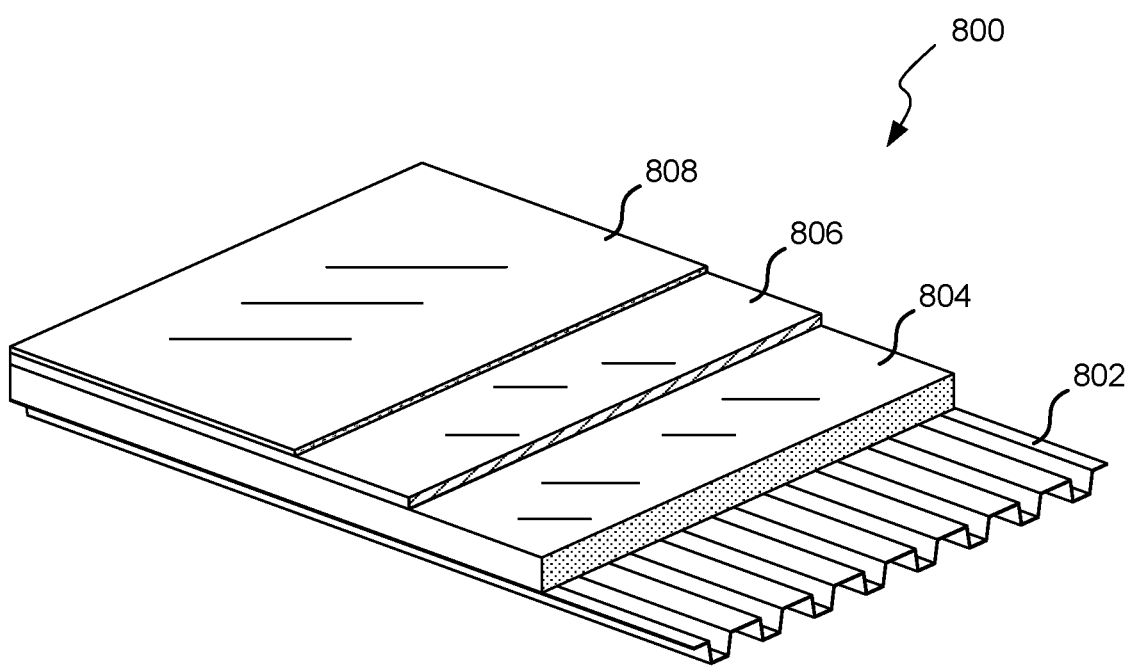
FIG. 8 shows a construction of a commercial roof deck in accordance with embodiments of the invention.

Referring now to FIG. 8, a construction of a commercial roof deck (i.e., roof system 800) is shown. Roof system 800 includes a structural deck 802, which is commonly made of steel or galvanized metal (18 to 22 gauge), although other types of materials and/or sizes are possible. The structural deck 802 is commonly positioned above steel, metal, or other joists and supported thereby. A plurality of foam insulation boards 804 (hereinafter insulation boards 804) are positioned atop the structural deck 802 to form an insulative layer of roofing system 800. As described herein, the insulation boards 804 are preferably polyisocyanurate foam boards having R-value per inch of at least 5.7 when measured at 40° F. The foam board may be any foam board described herein.

In some embodiments, a plurality of cover boards 806 are positioned atop the insulation boards 804 to add a protective layer to roofing system 800. The cover boards 806 may be added for fire and/or mechanical protection (e.g., hail or impact resistance) or for various other reasons. In embodiments, the cover boards 806 may include perlite based boards, gypsum based boards, and the like. In some embodiments, the roofing system 800 does not include cover boards 806. In some embodiments, the cover boards may be boards embodying the invention.

A waterproof membrane 808 is positioned atop the roofing system 800. The waterproof membrane 808 may be positioned atop the cover boards 806, insulation boards 804, and/or another component/layer of the roofing system 800. In some embodiments, the waterproof membrane 808 may include a built-up roof, modified bitumen, thermoplastic olefin (TPO), ethylene propylene diene monomer (EPDM), metal, and the like. The waterproof membrane 808 may be ballasted, adhered, mechanically fastened, and the like atop the roofing system 800 to couple the waterproof membrane 808 with the roofing system's components/layers. Further, individual components of the waterproof membrane 808 may be coupled together to form the waterproof membrane 808. For example, individual TPO segments, sheets, or strips may be heat welded together to form a substantially continuous TPO layer atop the roofing system 800. Similarly, individual EPDM segments may be adhered or bonded together and metal segments may be mechanically fastened or bonded to form a substantially continuous waterproof membrane layer.

The roofing system 800 may be slightly sloped to promote drainage of water and/or for various other reasons as desired. The roof system 800 may also include other components, layers, and/or materials that are not shown, such as bonding cement, primer, acoustic infills, and the like.

As described herein, the insulation boards 804 and/or cover boards 806 are polyisocyanurate foam boards that include a polyisocyanurate core. The polyisocyanurate core is produced from an isocyanate, a polyol, and a blowing agent. The polyisocyanurate core may be any core described herein.

In some embodiments, each of the insulation boards 804 also includes a facer that is coupled with one or more surfaces of the insulation board 804, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 804 may have a foam density of between about 1.5 and 2.0 lbs/ft$^3$, and more commonly between about 1.6 and 1.7 lbs/ft$^3$. In some embodiments, the insulation board's polyisocyanurate core also includes between 1 and 10 weight percent of a hydrocarbon blowing agent. The insulation boards 804 commonly include between about 5 and 8 weight percent of the hydrocarbon blowing agent.

In some embodiments, each of the cover boards 806 also includes a facer that is coupled with one or more surfaces of the cover board 806, commonly both surfaces. The facer typically includes a glass fiber mat, but may include other types of facer materials. The cover board 806 may have a foam density of between about 3 and 8 lbs/ft$^3$, and more commonly between about 6 and 7 lbs/ft$^3$. In some embodiments, the cover board's polyisocyanurate core also includes between 1 and 10 weight percent of a hydrocarbon blowing agent, which may be a highly flammable material as described herein above. The cover boards 806 commonly include between about 1.5 and 3 weight percent of the hydrocarbon blowing agent.

Figure 9:
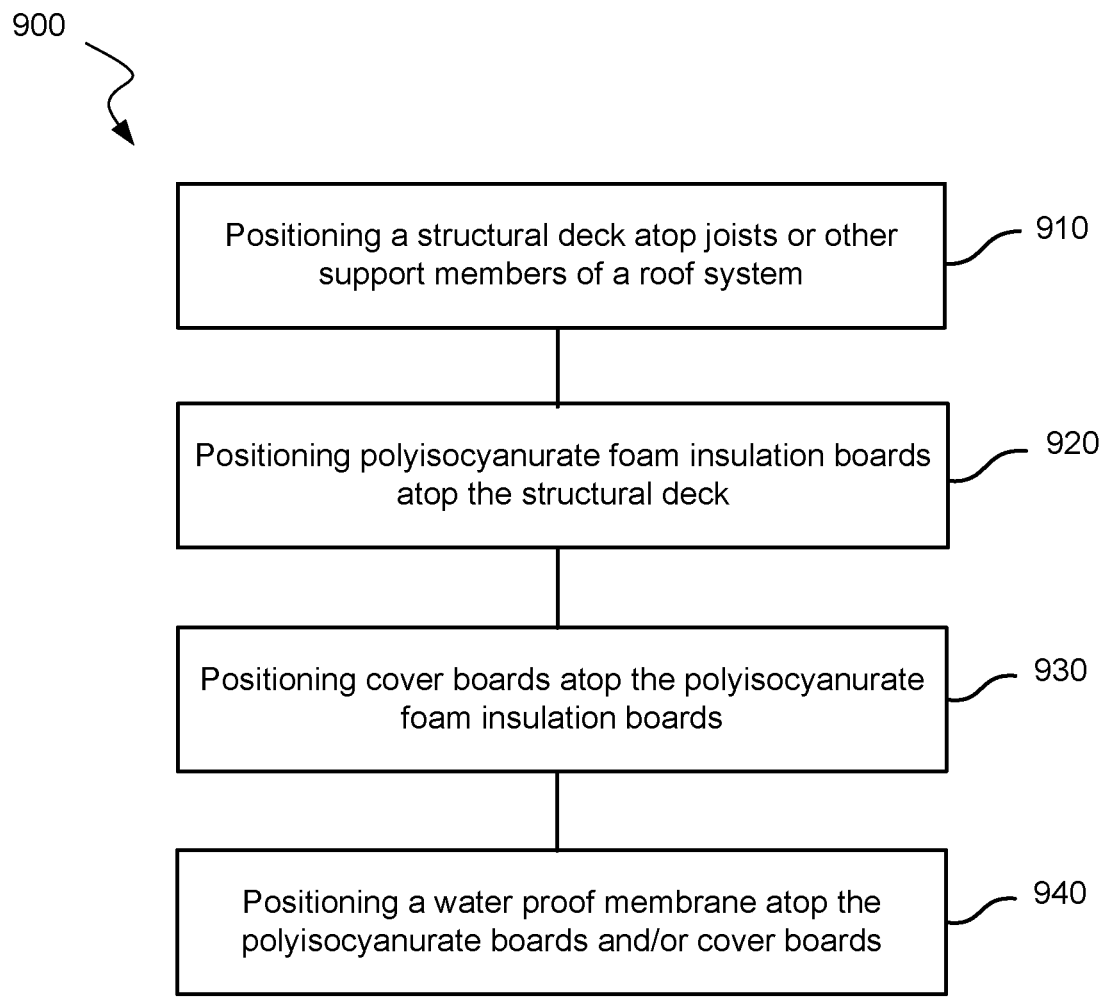
FIG. 9 illustrates a method of forming a roofing system in accordance with embodiments of the invention.

Referring now to FIG. 9, illustrated is a method 900 of forming a roofing system of a structure. At block 910, a structural deck is assembled atop joists (metal and the like) or other structurally supporting members. At block 920, a plurality of foam insulation boards (i.e., polyisocyanurate foam roof insulation boards) are positioned atop the structural deck to provide an insulation layer for the roofing system. At block 930, a plurality of cover boards are optionally positioned atop the foam insulation boards to form a protective layer for the roofing system. At block 940, a waterproof membrane is positioned atop the foam insulation boards and/or cover boards to provide a waterproof layer for the roofing system.

As described herein, at least one of the foam insulation boards includes a polyisocyanurate core that is produced from an isocyanate, a polyol, and a blowing agent. The polyisocyanurate core may be any polyisocyanurate core described herein, and preferably has an R-value per inch of at least 5.7 when measured at 40° F.

In some embodiments, at least one of the cover boards includes a polyisocyanurate core that is produced from an isocyanate, a polyol, and a blowing agent. In some embodiments, the method includes applying between 1 and 10 weight percent of the blowing agent to the polyisocyanurate core of the foam insulation board(s) and/or cover board(s). In some embodiments, the method further includes attaching a facer to at least one surface of the foam insulation board(s) and/or cover board(s).

Roofing systems may include those described in U.S. application Ser. No. 14/299,631, now U.S. Pat. No. 9,528,269, which is incorporated herein by reference for all purposes.

In other embodiments, it has been discovered that other chemicals added to the polyol in a PIR formulation can also improve the low temperature insulating properties of the resulting PIR foam. Such embodiments may provide good low temperature insulating properties without the use of a metallo-organic compound. In addition, it has been observed that high-functional polyols tend to result in a high viscosity of the B-side mixture. In general, while the higher viscosity may result in a smaller cell size and good thermal performance of the insulation, the higher viscosity tends to make processing of the formulation more difficult.

Several useful chemical additives are discussed below.

Low-Molecular-Weight Additives

One chemical type that can also improve the low temperature insulating properties of the resulting PIR foam when added to the polyol in a PIR formulation is a low-molecular-weight hydroxyl group containing additive, for example multi-functional alcohols, hydroxy alkyl amines, or other additives. These additives may improve the thermal performance of the resulting insulation without unduly increasing the viscosity of the B-side mixture. For the purposes of this disclosure, "low-molecular-weight" means having a molecular weight below 1000.

Tables 6-8 below illustrate an example formulation prepared in accordance with embodiments of the invention in a small batch, and is designated Example 9.

TABLE 6

Example 9 B-Side

| B-Side Formulation Ingredient | Wt (lb) | Parts | Batch Wt % |
|---|---|---|---|
| Invista HT5503 | 55.54 | 100 | 28.01 |
| TEA | 5.55 | 10 | 2.80 |
| PC5 | 0.11 | 0.20 | 0.06 |
| TCPP | 6.66 | 12.00 | 3.36 |
| OMG 977 (k-oct) | 2.22 | 4 | 1.12 |
| OMG 1123 (K-Ace) | 0.25 | 0.45 | 0.13 |
| Vorasurf 504 | 1.39 | 2.50 | 0.70 |
| Water | 0.17 | 0.30 | 0.08 |
| Pentane | 12.77 | 23 | 6.44 |
| Total "B" | 84.67 | 152.45 | 42.7 |

TABLE 7

Example 9 A-Side

| A-Side Formulation Ingredient | Wt (lb) | Parts | Batch Wt % |
|---|---|---|---|
| Yantai Wannate PM-700 | 113.59 | 204.54 | 57.3 |
| Total "A" | 113.59 | 204.54 | 57.3 |

TABLE 8

Example 9 Total

| Total Formulation | Wt (lb) | Parts | Batch Wt % |
|---|---|---|---|
| Total "A" + "B" | 198.26 | 356.99 | 100.00 |

In the Example 9, PC5 is pentamethyldiethylenetriamine, a catalyst also known as PMDETA, available from Huntsman Corporation of The Woodlands, Tex., USA. TEA is triethanolamine, an example of a multi-functional alcohol. TEA has three primary hydroxy groups and a molecular weight of 149, and can be represented chemically as:

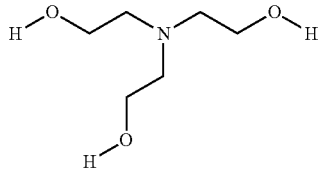

Table 9 below gives performance data for Examples 9-12 having varying amounts of TEA in the formulation. The "parts" listed in Table 9 refer to parts of TEA per 100 parts polyol. Examples 10-12 are otherwise identical to Example 9. Also provided is performance data for a control formulation having no TEA, but otherwise identical to Example 9.

TABLE 9

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No TEA) | 5.646 | 6.259 | 6.526 | 6.614 | 6.592 | 6.445 | 1.75 |
| 9 (10 parts TEA) | 6.200 | 6.551 | 6.620 | 6.571 | 6.498 | 6.312 | 1.65 |
| 10 (5 parts TEA) | 6.077 | 6.517 | 6.642 | 6.612 | 6.543 | 6.34 | 1.62 |
| 11 (15 parts TEA) | 6.371 | 6.623 | 6.626 | 6.499 | 6.410 | 6.207 | 1.58 |
| 12 (20 parts TEA) | 6.423 | 6.556 | 6.525 | 6.382 | 6.292 | 6.08 | 1.51 |

For each example, a 12×12 inch sample PIR board was prepared and aged 24 hours. Each of the samples was 2 inches thick and included a glass-reinforced paper facer. Each sample was tested for its insulation performance.

Figure 10:
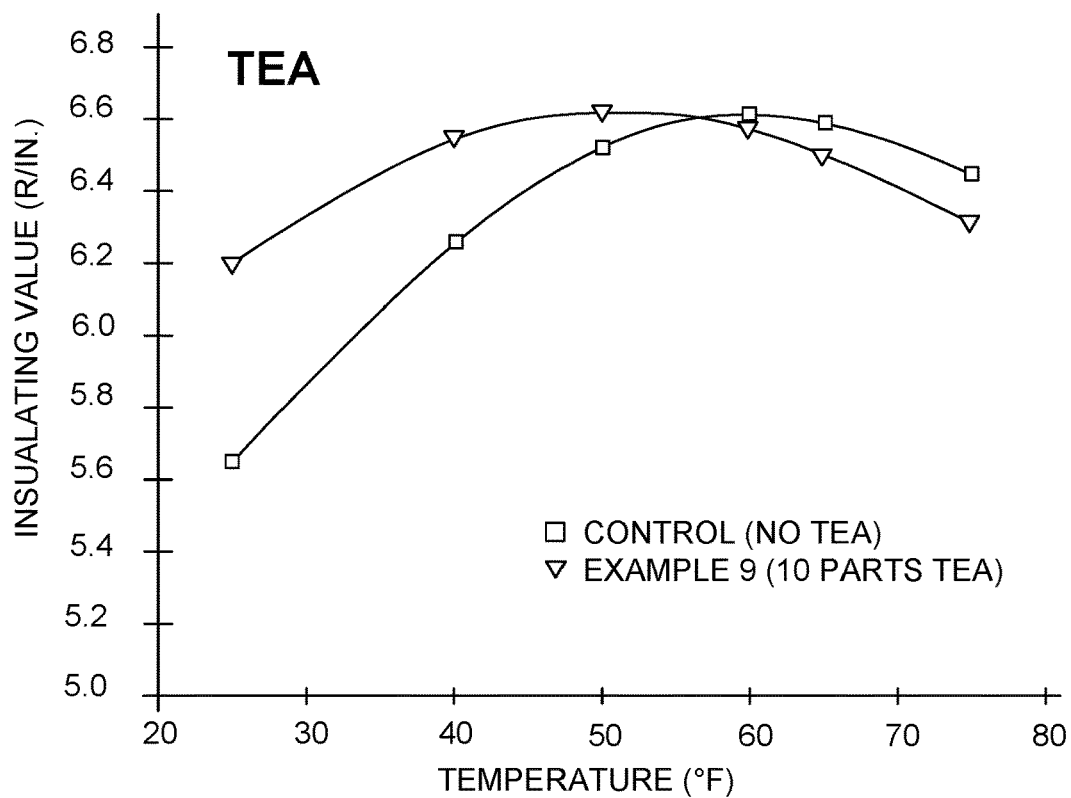
FIG. 10 illustrates the thermal performance of a polyisocyanurate formulation in accordance with another embodiment of the invention.

FIG. 10 illustrates the performance for the formulation of Example 9 graphically. As is apparent in Table 9 and FIG. 10, the addition of TEA into the formulation shifted the peak R-value by about 10° F. toward colder temperatures, and raised the R-value at 25° F. by about 0.55 R/in.

Figure 11:
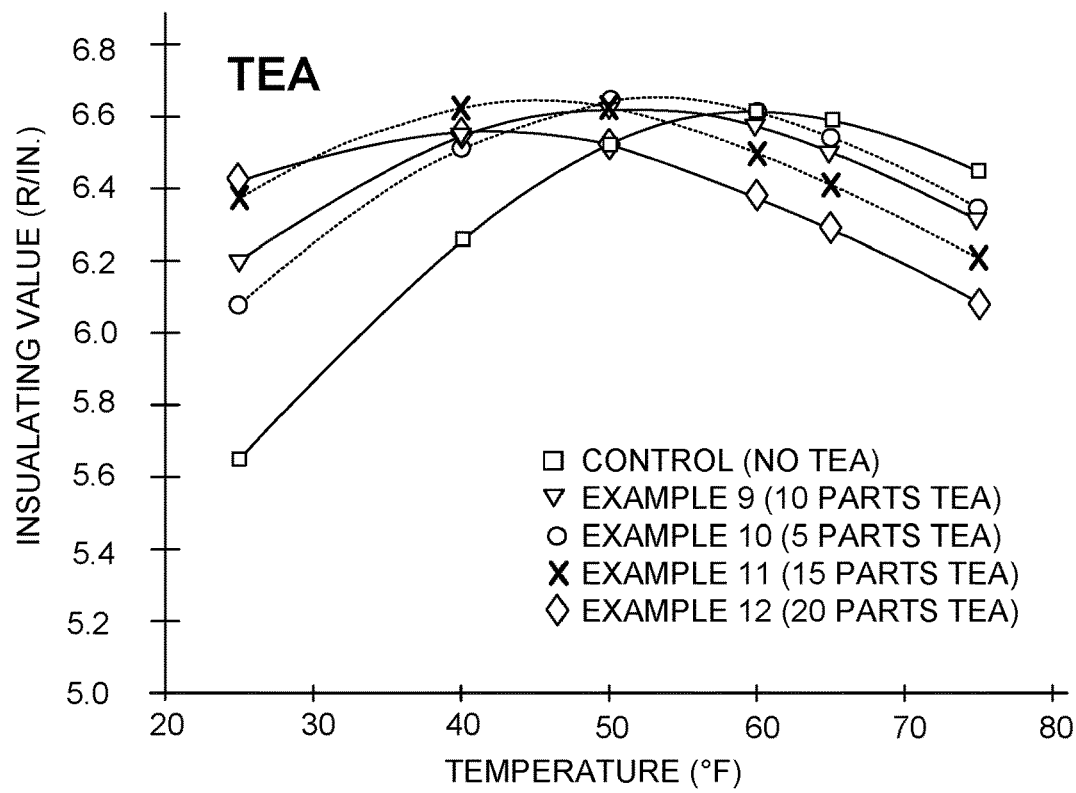
FIG. 11 illustrates the thermal performance of several polyisocyanurate formulations in accordance with embodiments of the invention.

FIG. 11 shows the insulation performance data from Table 9, including performance data for all four of Examples 9-12 having different proportions of TEA, and the control formulation without TEA. As is apparent, increasing amounts of TEA in the formulation generally continued to increase the R-value at 25° F., and to shift the peak R-value toward colder temperatures.

Figure 12:
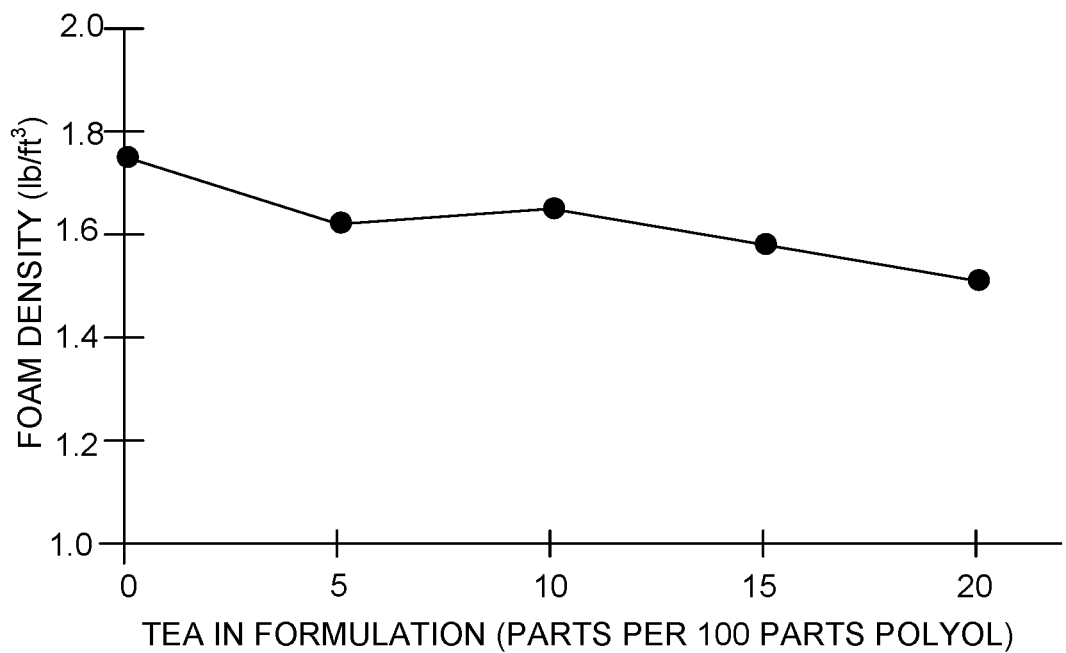
FIG. 12 illustrates the effect of triethanolamine on the density of a polyisocyanurate foam, in accordance with embodiments of the invention.

As is shown in Table 9, increasing amounts of TEA also tended to generally decrease the density of the resulting PIR board, although some variation is present. This trend is shown graphically in FIG. 12.

Examples 9-12 discussed above all used HT 5503 as the polyol. Additional examples were prepared using different polyols, to verify that the addition to TEA would produce similar improvements with other polyols. Table 10 below shows the results obtained using 10 parts TEA per 100 parts polyol with two different polyols, as well as the performance data for the control formulation shown earlier.

Example 13 used Terol 563 as the polyol, available from Huntsman Corporation. Example 14 used Stepanol® PS 2352 as the polyol, available from Stepan Company of Northfield, Ill., USA.

TABLE 10

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No TEA) | 5.646 | 6.259 | 6.526 | 6.614 | 6.592 | 6.445 | 1.75 |
| 13 (10 parts TEA, Terol 563) | 6.192 | 6.546 | 6.610 | 6.539 | 6.461 | 6.264 | 1.54 |
| 14 (10 parts TEA, Stepan PS 2352) | 6.282 | 6.607 | 6.678 | 6.614 | 6.54 | 6.35 | 1.63 |

Figure 13:
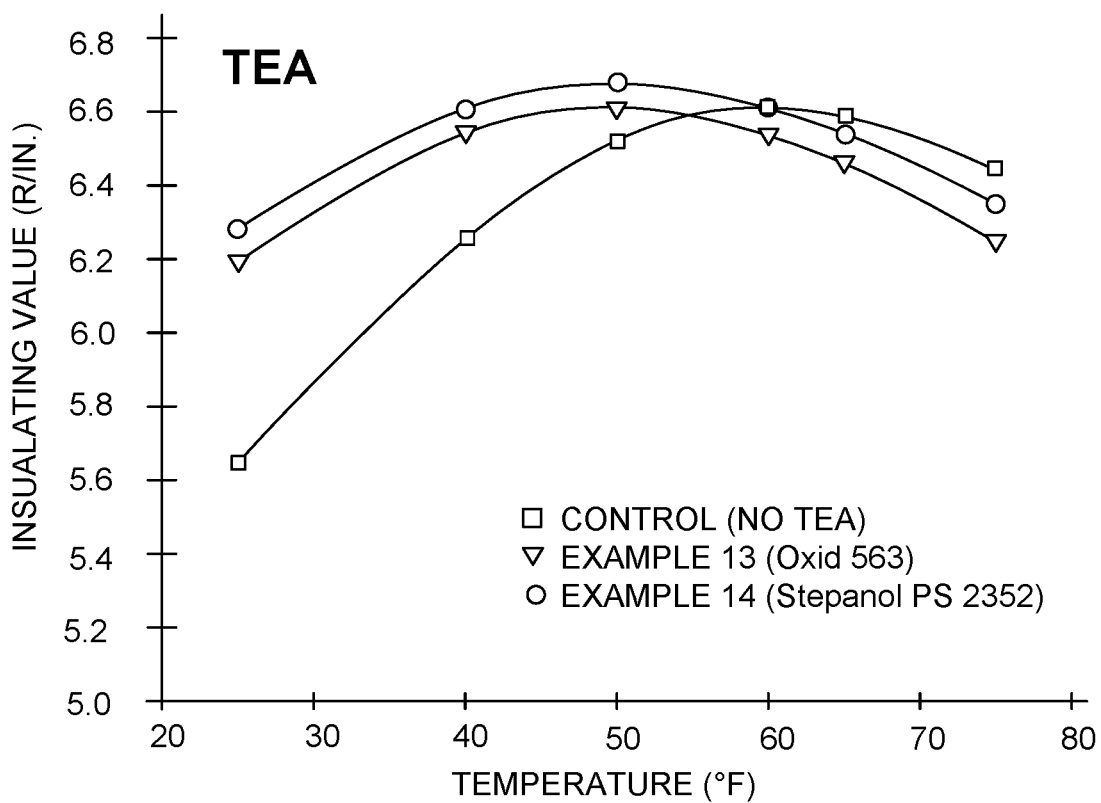
FIG. 13 illustrates the thermal performance of additional polyisocyanurate formulations in accordance with embodiments of the invention.

FIG. 13 shows the data of Table 10 graphically. As is apparent, the addition of 10 parts TEA produces a similar change in the insulation performance of the formulations using Terol 563 and Stepanol® PS 2352, as compared with the control formulation, as when TEA is added to a formulation using HT 5503 as the polyol.

In other embodiments, other multi-functional alcohols may be used. A multi-functional alcohol suitable for embodiments of the invention may have an average molecular weight of 50 to 20000, and preferably between 50 and 500. Such multi-functional alcohols advantageously have functionality greater than 2, preferably 3, and up to 8, preferably 6, of active hydrogen per molecule. In various embodiments, the multi-functional alcohols include aliphatic, cycloaliphatic, aromatic, heterocyclic polyhydric alcohols and combinations thereof, for example, triethanolamine (TEA), glycerol, trimethylol ethane, tri-methylol propane, pentaerythritol, di-pentaerythritol, tripentaerythritol, sorbitol, methyl glucoside, alkoxylated glycerol, alkoxylated pentaerythritol, alkoxylated methyl glucoside, alkoxylated sucrose, alkoxylated sorbitol, alkoxylated trimethylol ethane, alkoxylated trimethylol propane, amine polyol (Jeffol A-630, A-800 from Huntsman and Quadrol from BASF), Mannich polyol (Jeffol R-470X).

In another embodiment, the multifunctional alcohol could be triglyceride based natural oil polyol or functionalized natural oil, for example, castor oil or hydroxylated epoxidized natural oil. Multiple additives may be used, in any workable combination. In some embodiments, at least some additives may have a molecular weight below 500, for example between 70 and 500.

Formulations including multi-functional alcohols may incorporate any of the other elements and features discussed above, for example any of the isocyanate compounds, polyols, fire retardants, catalysts, surfactants, initiators, carbohydrates, blowing agents, emulsifiers, metallo-organic compounds, and other elements, in any workable combination. A foam board made with a formulation including a multi-functional alcohol may have an iso index, density, cell size, residual blowing agent, or other features in accordance with the above descriptions. Any workable facers may be placed on either or both surfaces of the board.

Trimethylolpropane (TMP)

Another chemical that can improve the low temperature properties of a PIR foam when added to the polyol mixture is trimethylolpropane, also known as TMP. TMP has three primary hydroxy groups and a molecular weight of 104, and can be represented chemically as:

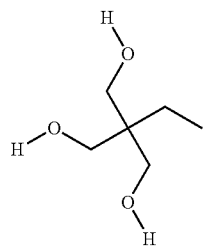

Table 11 below gives performance data for Examples 15 and 16 having respectively 5 and 10 parts of TMP in the formulation, per 100 parts polyol. Other than the substitution of TMP for TEA in the different amounts, examples 15 and 16 are identical to Example 9. Also provided is performance data for a control formulation having no TMP. The control formulation of Table 11 is the same as the control formulation of Table 9 above.

TABLE 11

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No TMP) | 5.646 | 6.259 | 6.526 | 6.614 | 6.592 | 6.445 | 1.75 |
| 15 (5 parts TMP) | 5.941 | 6.422 | 6.615 | 6.654 | 6.605 | 6.424 | 1.84 |
| 16 (10 parts TMP) | 6.232 | 6.579 | 6.638 | 6.546 | 6.453 | 6.234 | 1.75 |

For each example, a 12×12 inch sample PIR board was prepared and aged 24 hours. Each of the samples was 2 inches thick and included a glass-reinforced paper facer. Each sample was tested for its insulation performance.

Figure 14:
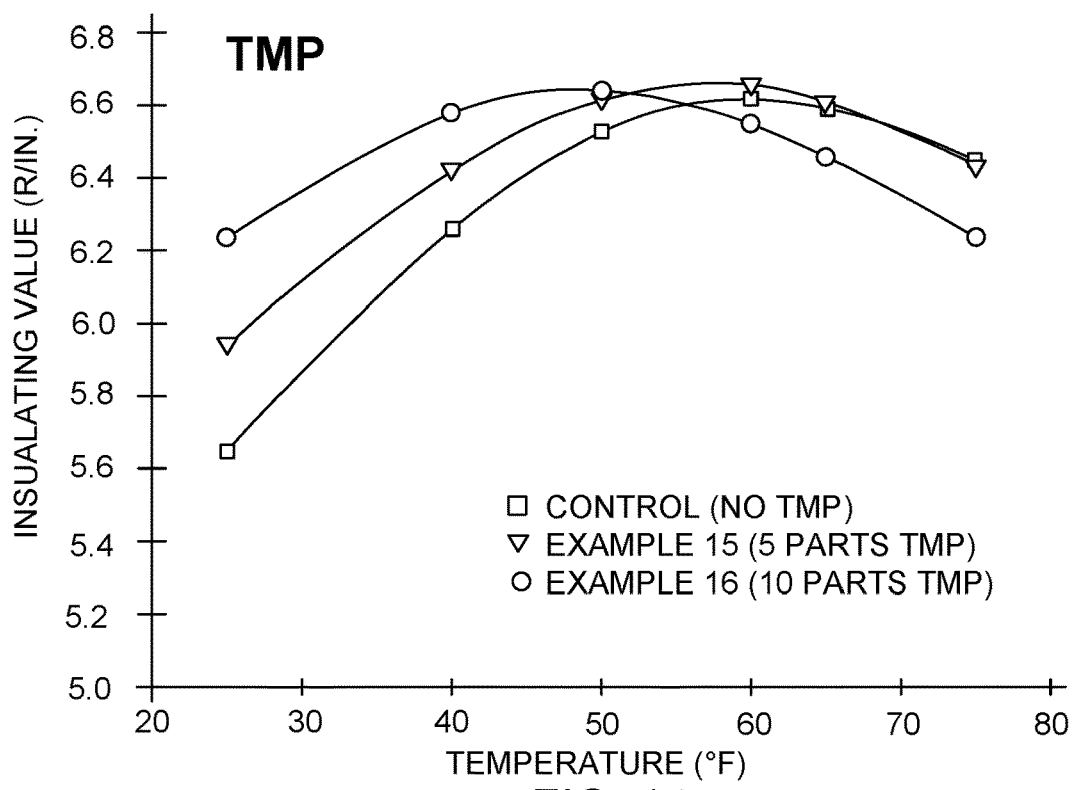
FIG. 14 illustrates the thermal performance of additional polyisocyanurate formulations using trimethylolpropane, in accordance with embodiments of the invention.

FIG. 14 illustrates the performance data of Table 11 graphically. As is apparent in Table 11 and FIG. 14, the addition of 10 parts TMP into the formulation shifted the peak R-value by about 10° F. toward colder temperatures, and raised the R-value at 25° F. by about 0.58 R/in.

Diethyl bis(2-hydroxyethyl)aminomethylphosphonate (DEHAMP)

Another chemical that can improve the low temperature properties of a PIR foam when added to the polyol mixture is diethyl bis(2-hydroxyethyl)aminomethylphosphonate, also known as DEHAMP. DEHAMP was discussed above as a fire retardant, but may also have utility in improving the R-value of a PIR foam. In embodiments of the invention, DEHAMP is preferably used for its ability to improve R-value, with fire retardant properties primarily provided by a separate fire retardant, for example TCPP. DEHAMP has two primary hydroxy groups and a molecular weight of 255, and can be represented chemically as:

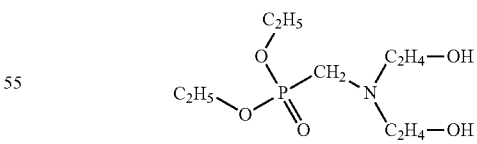

Table 12 below gives performance data for Examples 17 and 18 having respectively 5 and 10 parts of DEHAMP in the formulation, per 100 parts polyol. Other than the substitution of DEHAMP for TEA in the different amounts, examples 17 and 18 are identical to Example 9. Also provided is performance data for a control formulation having no DEHAMP. The control formulation of Table 12 is the same as the control formulation of Table 9 above.

TABLE 12

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No DEHAMP) | 5.646 | 6.259 | 6.526 | 6.614 | 6.592 | 6.445 | 1.75 |
| 17 (5 parts DEHAMP) | 6.124 | 6.621 | 6.743 | 6.686 | 6.604 | 6.385 | 1.82 |
| 18 (10 parts DEHAMP) | 6.042 | 6.539 | 6.698 | 6.690 | 6.619 | 6.418 | 1.82 |

For each example, a 12×12 inch sample PIR board was prepared and aged 24 hours. Each of the samples was 2 inches thick and included a glass-reinforced paper facer. Each sample was tested for its insulation performance.

Figure 15:
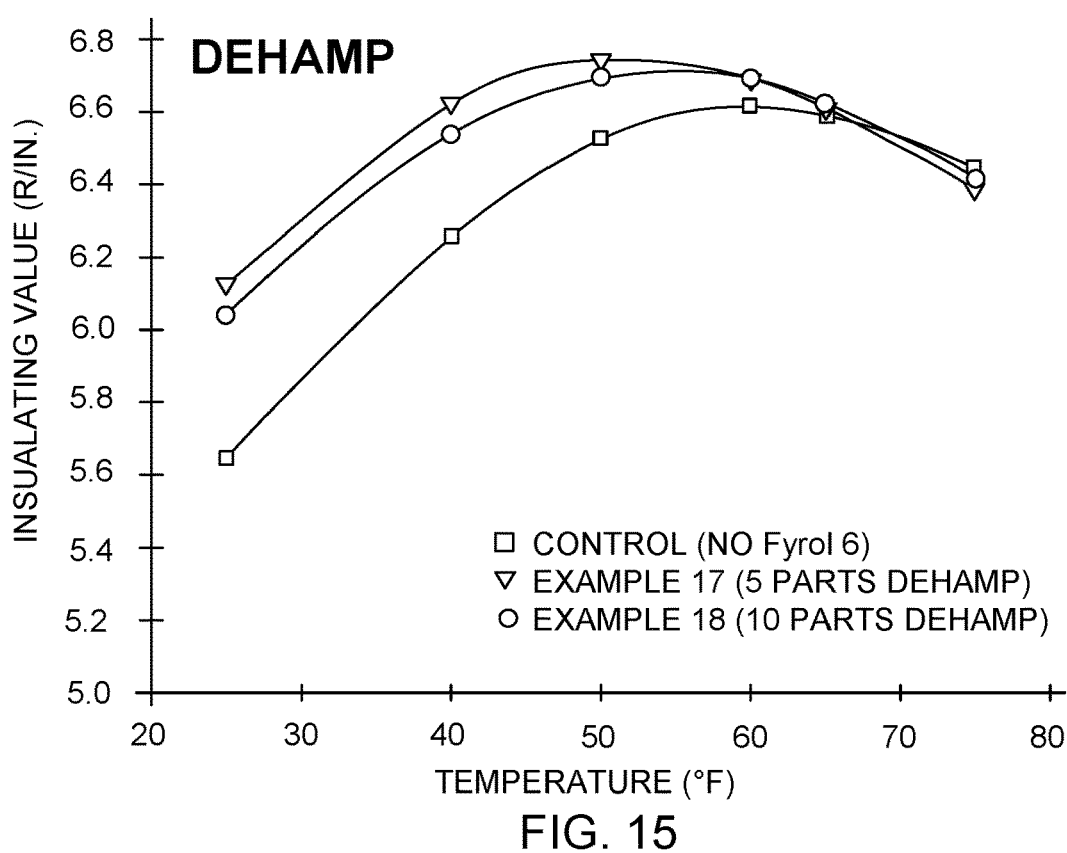
FIG. 15 illustrates the thermal performance of additional polyisocyanurate formulations using DEHAMP, in accordance with embodiments of the invention.

FIG. 15 illustrates the performance data of Table 12 graphically. As is apparent in Table 12 and FIG. 15, the addition of 5 parts DEHAMP into the formulation shifted the peak R-value by about 10° F. toward colder temperatures, and raised the R-value at 25° F. by about 0.47 R/in.

Diethyl Hydroxymethyl Phosphonate (DEHMP)

Another chemical that can improve the low temperature properties of a PIR foam when added to the polyol mixture is diethyl hydroxymethyl phosphonate, also known as DEHMP. DEHMP was discussed above as a fire retardant, but may also have utility in improving the R-value of a PIR foam. DEHMP has one primary hydroxy group and a molecular weight of 168, and can be represented chemically as:

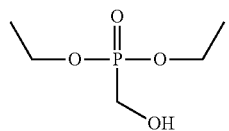

Table 13 below gives performance data for Example 19 having 5 parts DEHMP in the formulation, per 100 parts polyol. Other than the substitution of DEHMP for TEA, example 19 is identical to Example 10. Also provided is performance data for a control formulation having no DEHMP. The control formulation of Table 13 is the same as the control formulation of Table 9 above.

TABLE 13

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No DEHMP) | 5.646 | 6.259 | 6.526 | 6.614 | 6.592 | 6.445 | 1.75 |
| 19 (5 parts DEHMP) | 5.761 | 6.313 | 6.511 | 6.533 | 6.467 | 6.264 | 1.68 |

For each example, a 12×12 inch sample PIR board was prepared and aged 24 hours. Each of the samples was 2 inches thick and included a glass-reinforced paper facer. Each sample was tested for its insulation performance.

Figure 16:
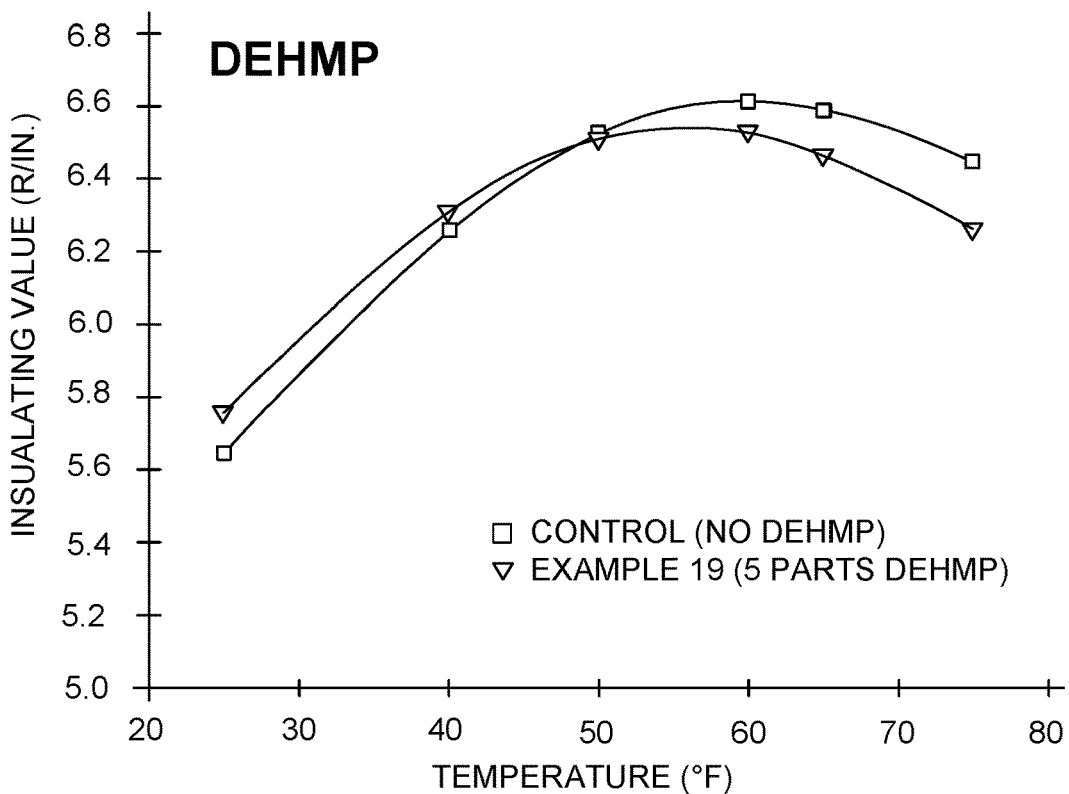
FIG. 16 illustrates the thermal performance of additional polyisocyanurate formulations using DEHMP, in accordance with embodiments of the invention.

FIG. 16 illustrates the performance data of Table 13 graphically. As is apparent in Table 13 and FIG. 16, the addition of 5 parts DEHMP into the formulation results in a modest improvement in the low-temperature insulation performance of the PIR foam.

N-methyldiethanolamine (MDEA)

Another chemical that can improve the low temperature properties of a PIR foam when added to the polyol mixture is N-methyldiethanolamine, also known as MDEA. MDEA has two primary hydroxy groups and a molecular weight of 119, and can be represented chemically as:

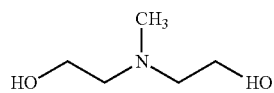

Table 14 below gives performance data for Examples 20 and 21 having respectively 5 and 10 parts of MDEA in the formulation, per 100 parts polyol. Other than the substitution of MDEA for TEA in the different amounts, examples 20 and 21 are identical to Example 9. Also provided is performance data for a control formulation having no MDEA. The control formulation of Table 14 is the same as the control formulation of Table 9 above.

TABLE 14

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No MDEA) | 5.646 | 6.259 | 6.526 | 6.614 | 6.592 | 6.445 | 1.75 |
| 20 (5 parts MDEA) | 5.770 | 6.390 | 6.638 | 6.653 | 6.581 | 6.361 | 1.59 |
| 21 (10 parts MDEA) | 5.741 | 6.422 | 6.679 | 6.707 | 6.648 | 6.457 | 1.53 |

For each example, a 12×12 inch sample PIR board was prepared and aged 24 hours. Each of the samples was 2 inches thick and included a glass-reinforced paper facer. Each sample was tested for its insulation performance.

Figure 17:
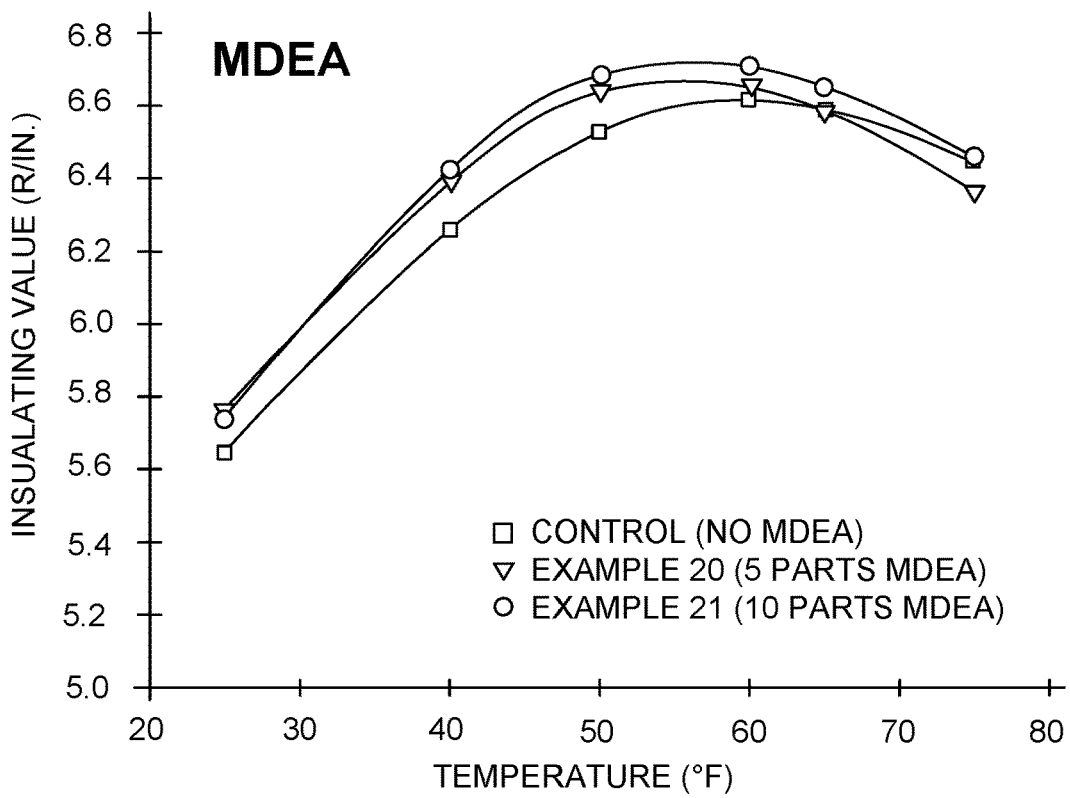
FIG. 17 illustrates the thermal performance of additional polyisocyanurate formulations using N-methyldiethanolamine, in accordance with embodiments of the invention.

FIG. 17 illustrates the performance data of Table 14 graphically. As is apparent in Table 14 and FIG. 17, the addition of MDEA into the formulation results in an improvement in the low-temperature performance of the PIR foam.

1,4-butanediol (BD)

Another chemical that can improve the low temperature properties of a PIR foam when added to the polyol mixture is 1,4-butanediol, also known as BD. BD has two primary hydroxy groups and a molecular weight of 90, and can be represented chemically as:

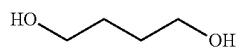

Table 15 below gives performance data for Examples 22 and 23 having respectively 5 and 10 parts of BD in the formulation, per 100 parts polyol. Other than the substitution of BD for TEA in the different amounts, examples 22 and 23 are identical to Example 9. Also provided is performance data for a control formulation having no BD. The control formulation of Table 15 is the same as the control formulation of Table 9 above.

TABLE 15

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No BD) | 5.646 | 6.259 | 6.526 | 6.614 | 6.592 | 6.445 | 1.75 |
| 22 (5 parts BD) | 5.932 | 6.467 | 6.655 | 6.650 | 6.578 | 6.367 | 1.66 |
| 23 (10 parts BD) | 6.118 | 6.491 | 6.598 | 6.545 | 6.462 | 6.245 | 1.67 |

For each example, a 12×12 inch sample PIR board was prepared and aged 24 hours. Each of the samples was 2 inches thick and included a glass-reinforced paper facer. Each sample was tested for its insulation performance.

Figure 18:
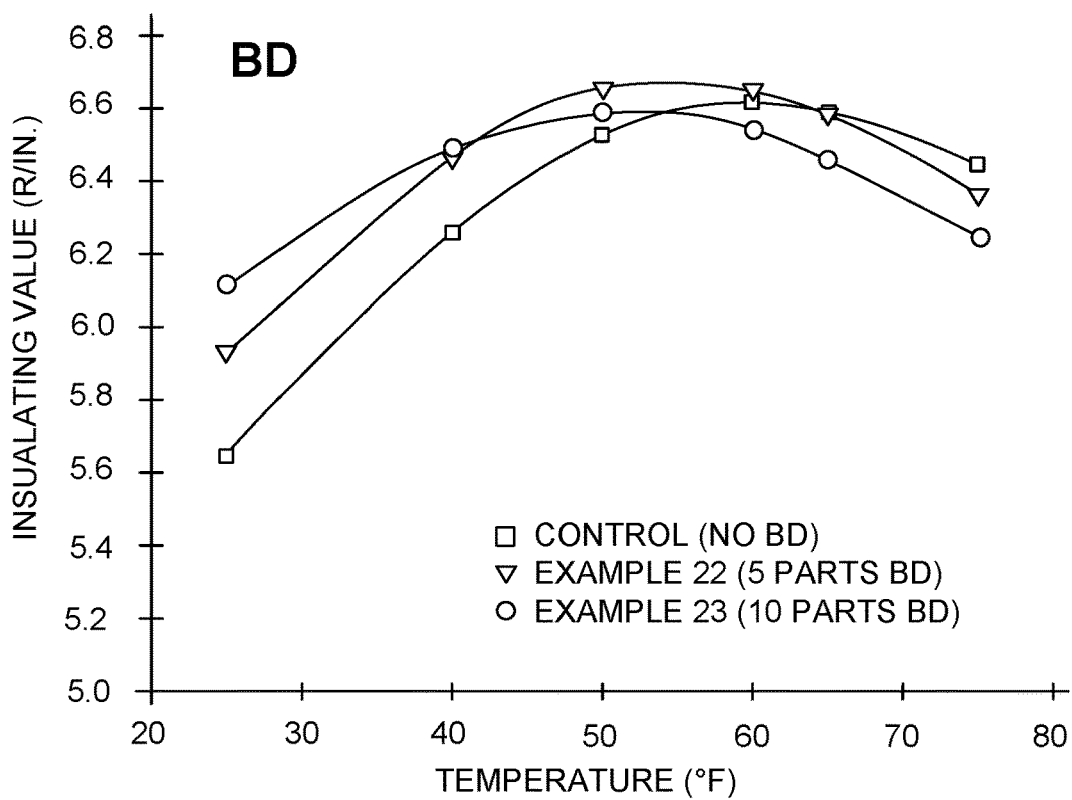
FIG. 18 illustrates the thermal performance of additional polyisocyanurate formulations using 1,4 butanediol, in accordance with embodiments of the invention.

FIG. 18 illustrates the performance data of Table 15 graphically. As is apparent in Table 15 and FIG. 18, the addition of 10 parts BD into the formulation shifted the peak R-value by about 10° F. toward colder temperatures, and raised the R-value at 25° F. by about 0.47 R/in.

Diethylethanolamine (DEEA)

Another chemical that can improve the low temperature properties of a PIR foam when added to the polyol mixture is diethylethanolamine, also known as DEEA. DEEA has one primary hydroxy group and a molecular weight of 117, and can be represented chemically as:

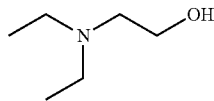

Table 16 below gives performance data for Examples 24 and 25 having respectively 5 and 10 parts of DEEA in the formulation, per 100 parts polyol. Other than the substitution of DEEA for TEA in the different amounts, examples 24 and 25 are identical to Example 9. Also provided is performance data for a control formulation having no DEEA. The control formulation of Table 16 is the same as the control formulation of Table 9 above.

TABLE 16

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No DEEA) | 5.646 | 6.259 | 6.526 | 6.614 | 6.592 | 6.445 | 1.75 |
| 24 (5 parts DEEA) | 5.749 | 6.447 | 6.747 | 6.775 | 6.710 | 6.496 | 1.58 |
| 25 (10 parts DEEA) | 5.906 | 6.570 | 6.786 | 6.768 | 6.697 | 6.471 | 1.53 |

For each example, a 12×12 inch sample PIR board was prepared and aged 24 hours. Each of the samples was 2 inches thick and included a glass-reinforced paper facer. Each sample was tested for its insulation performance.

Figure 19:
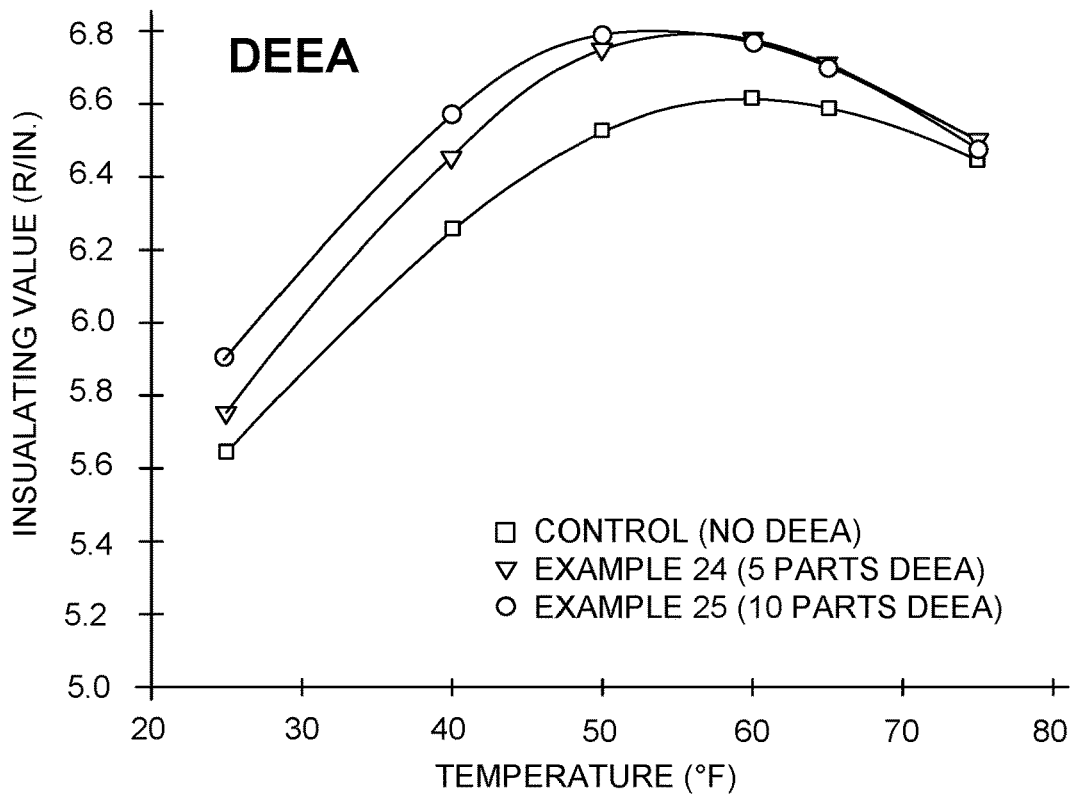
FIG. 19 illustrates the thermal performance of additional polyisocyanurate formulations using diethylethanolamine, in accordance with embodiments of the invention.

FIG. 19 illustrates the performance data of Table 16 graphically. As is apparent in Table 16 and FIG. 19, the addition of 10 parts DEEA into the formulation shifted the peak R-value by about 10° F. toward colder temperatures, and raised the R-value at 25° F. by about 0.26 R/in.

Isobutanol

Another chemical that can improve the low temperature properties of a PIR foam when added to the polyol mixture is isobutanol. Isobutanol has one primary hydroxy group and a molecular weight of 74, and can be represented chemically as:

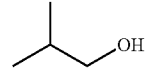

Table 17 below gives performance data for Examples 26 and 27 having respectively 5 and 10 parts of isobutanol in the formulation, per 100 parts polyol. Other than the substitution of isobutanol for TEA in the different amounts, examples 26 and 27 are identical to Example 9. Also provided is performance data for a control formulation having no isobutanol. The control formulation of Table 17 is the same as the control formulation of Table 9 above.

TABLE 17

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No Isobutanol) | 5.646 | 6.259 | 6.526 | 6.614 | 6.592 | 6.445 | 1.75 |
| 26 (5 parts Isobutanol) | 5.999 | 6.462 | 6.641 | 6.636 | 6.568 | 6.367 | 1.76 |
| 27 (10 parts Isobutanol) | 5.912 | 6.341 | 6.478 | 6.465 | 6.404 | 6.234 | 1.70 |

For each example, a 12×12 inch sample PIR board was prepared and aged 24 hours. Each of the samples was 2 inches thick and included a glass-reinforced paper facer. Each sample was tested for its insulation performance.

Figure 20:
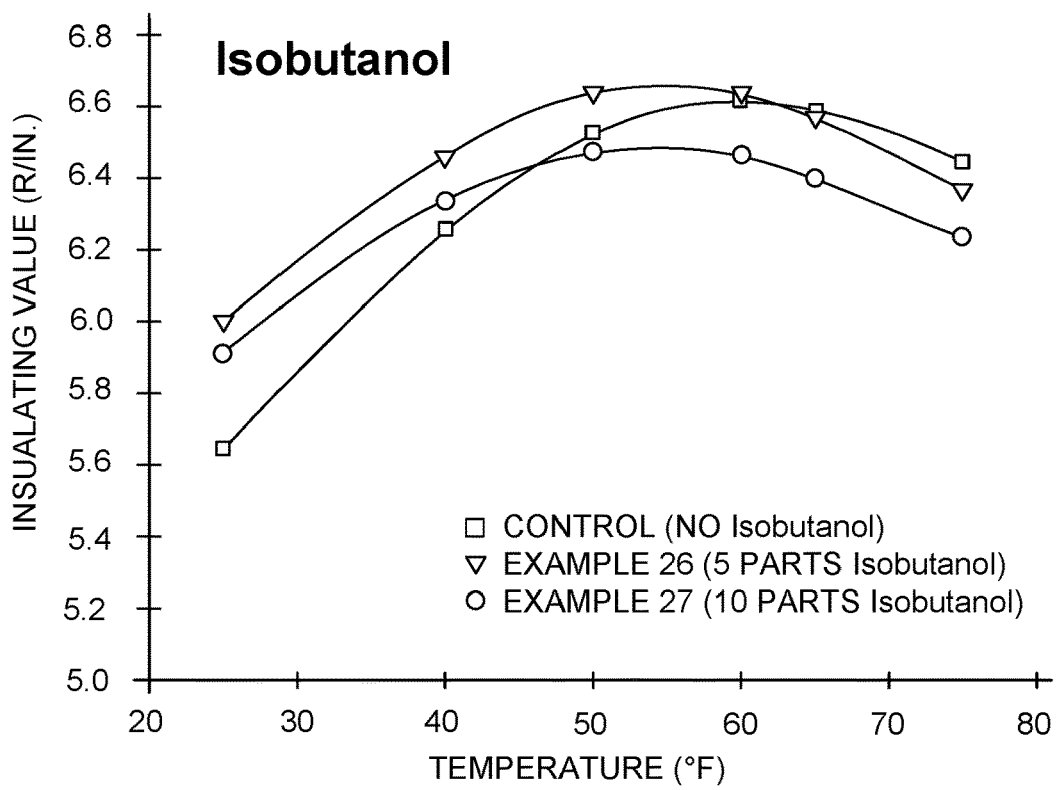
FIG. 20 illustrates the thermal performance of additional polyisocyanurate formulations using isobutanol, in accordance with embodiments of the invention.

FIG. 20 illustrates the performance data of Table 17 graphically. As is apparent in Table 17 and FIG. 20, the addition of 10 parts isobutanol into the formulation shifted the peak R-value by about 10° F. toward colder temperatures, and raised the R-value at 25° F. by about 0.35 R/in.

Diethyltoluenediamine (DETDA) Comparison

It is believed that the functionality of the polyol additives results in the improved low temperature performance of the resulting PIR foam. By comparison, table 18 below shows the temperature performance of a foam prepared using diethyltoluenediamine (DETDA). DETDA has no primary hydroxy groups, and can be represented chemically as:

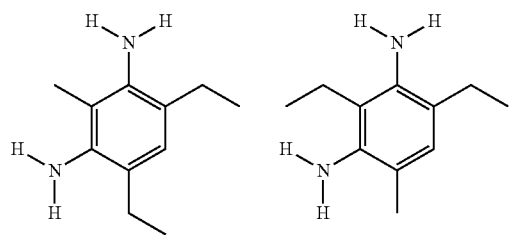

Table 18 below gives performance data for Examples 28 and 29 having respectively 0.5 and 1.0 parts of DETDA in the formulation, per 100 parts polyol. Other than the substitution of DETDA for TEA in the different amounts, examples 28 and 29 are identical to Example 9. Also provided is performance data for a control formulation having no DETDA. The control formulation of Table 18 is the same as the control formulation of Table 9 above.

TABLE 18

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control (No DETDA) | 5.646 | 6.259 | 6.526 | 6.614 | 6.592 | 6.445 | 1.75 |
| 28 (0.5 parts DETDA) | 5.553 | 6.155 | 6.471 | 6.594 | 6.581 | 6.454 | 1.72 |
| 29 (1.0 parts DETDA) | 5.369 | 6.058 | 6.429 | 6.608 | 6.626 | 6.533 | 1.63 |

For each example, a 12×12 inch sample PIR board was prepared and aged 24 hours. Each of the samples was 2 inches thick and included a glass-reinforced paper facer. Each sample was tested for its insulation performance.

Figure 21:
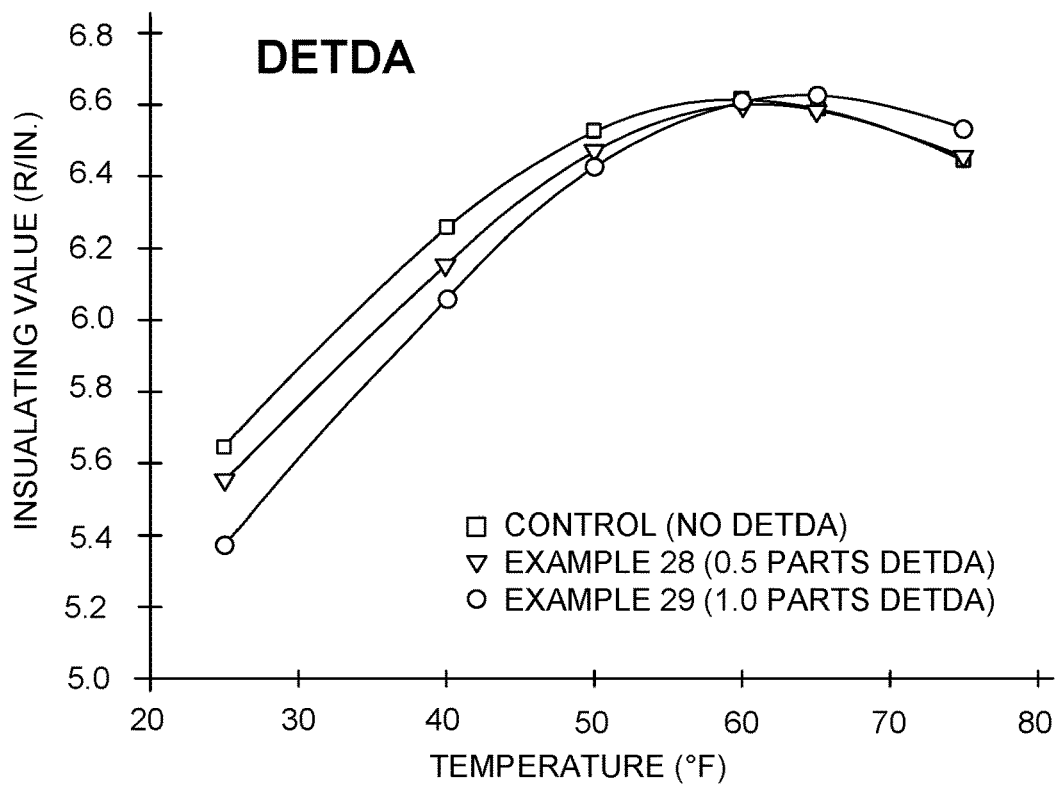
FIG. 21 illustrates the thermal performance of additional polyisocyanurate formulations using diethyltoluenediamine, in accordance with embodiments of the invention.

FIG. 21 illustrates the performance data of Table 18 graphically. As is apparent in Table 18 and FIG. 21, the addition of DETDA into the formulation results in slightly poorer low temperature performance as compared with the control formulation.

Additive Combinations

In some embodiments, additives may be combined to improve the low-temperature performance of a PIR foam. For example, TEA and TMP may be added in equal or unequal parts, for example 5 parts TEA and 5 parts TMP per hundred parts polyol.

In another example, sorbitol may be used as a polyol additive, alone or in combination with other additives such as TEA or TMP. Sorbitol has two primary hydroxy groups (plus four secondary OH groups) and a molecular weight of 182, and can be represented chemically as:

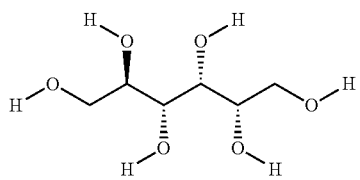 [SMILES: OC[C@@H](O)[C@@H](O)[C@H](O)[C@@H](O)CO]

Table 19 below gives performance data for Examples 30 and 31. Example 30 has 5 parts TEA and 5 parts TMP in the formulation, per 100 parts polyol. Example 31 has 5 parts TEA and 5 parts sorbitol in the formulation, per 100 parts polyol. Other than the substitution of the additive combinations for TEA, examples 30 and 31 are identical to Example 9. Also provided is performance data for a control formulation having no additive. The control formulation of Table 18 is the same as the control formulation of Table 9 above.

TABLE 19

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control | 5.646 | 6.259 | 6.526 | 6.614 | 6.592 | 6.445 | 1.75 |
| 30 (5 parts TEA + 5 parts TMP) | 5.943 | | 6.501 | 6.513 | 6.468 | 6.282 | 1.57 |
| 31 (5 parts TEA + 5 parts sorbitol) | 5.938 | 6.371 | 6.489 | 6.448 | 6.375 | 6.165 | 1.60 |

For each example, a 12×12 inch sample PIR board was prepared and aged 24 hours. Each of the samples was 2 inches thick and included a glass-reinforced paper facer. Each sample was tested for its insulation performance.

Figure 22:
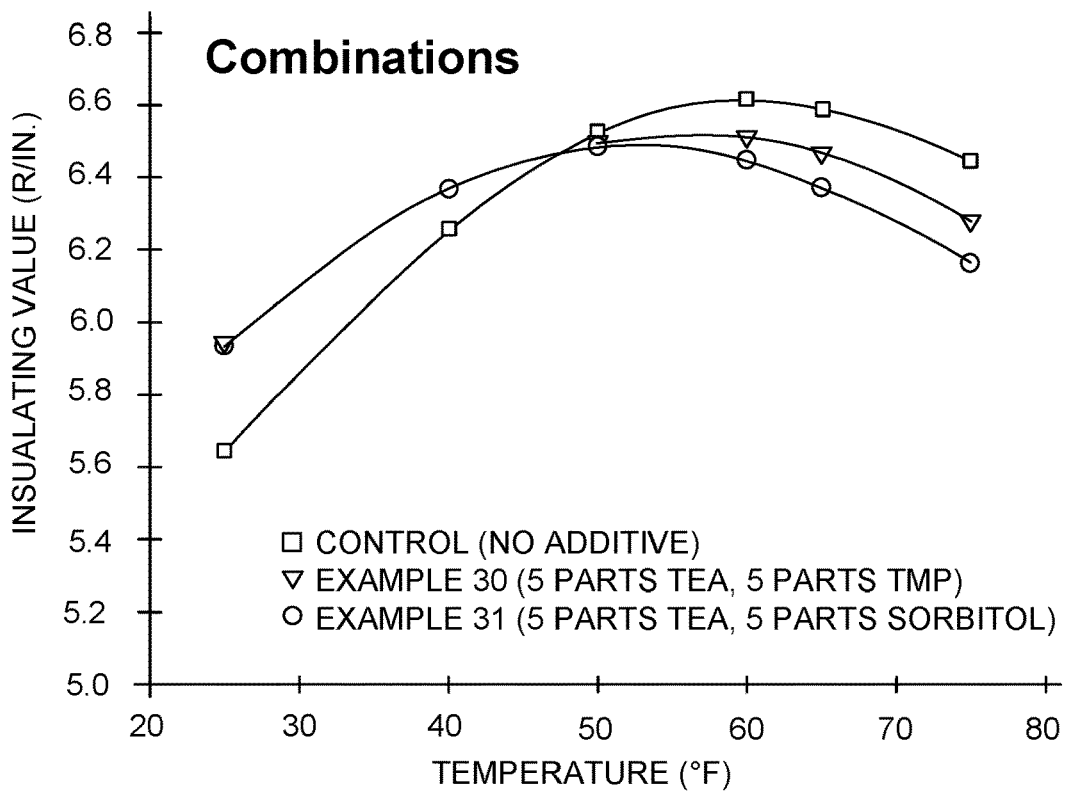
FIG. 22 illustrates the thermal performance of additional polyisocyanurate formulations using combinations of polyol additives, in accordance with embodiments of the invention.

FIG. 22 illustrates the performance data of Table 19 graphically. As is apparent in Table 19 and FIG. 22, the combination additives and raised the R-value at 25° F. by about 0.29 R/in.

Viscosity

It has been observed that the viscosity of the B-side mixture of a PIR formulation, prior to the addition of the blowing agent, has an effect on the ease of manufacturing of the resulting PIR foam boards. In general, a lower viscosity tends to ease processing of the formulation. In some cases, additives may be selected based on their effect on viscosity as well as their effect on thermal performance.

Table 20 below shows viscosity measurements of the B-side mixture of a control formulation and several other formulations having different additives, all measured before the addition of any blowing agent. Viscosity is given in centipoise (CPS) and was measured using a Brookfield DV-III Ultra rheometer with a number 5 spindle.

TABLE 20

| Example | CPS at 5 RPM | CPS at 10 RPM | CPS at 20 RPM | CPS at 30 RPM | CPS at 50 RPM | CPS at 70 RPM | CPS at 100 RPM |
|---|---|---|---|---|---|---|---|
| Control | 3120 | 3080 | 3060 | 3040 | 3032 | 3023 | 3000 |
| 10 parts TEA | 2080 | 1960 | 1940 | 1920 | 1896 | 1880 | 1868 |
| 10 parts DEHAMP | 2640 | 2600 | 2580 | 2560 | 2536 | 2520 | 2500 |
| 10 parts TMP | 4800 | 4360 | 3840 | 3600 | 3926 | 3080 | 2884 |

Figure 23:
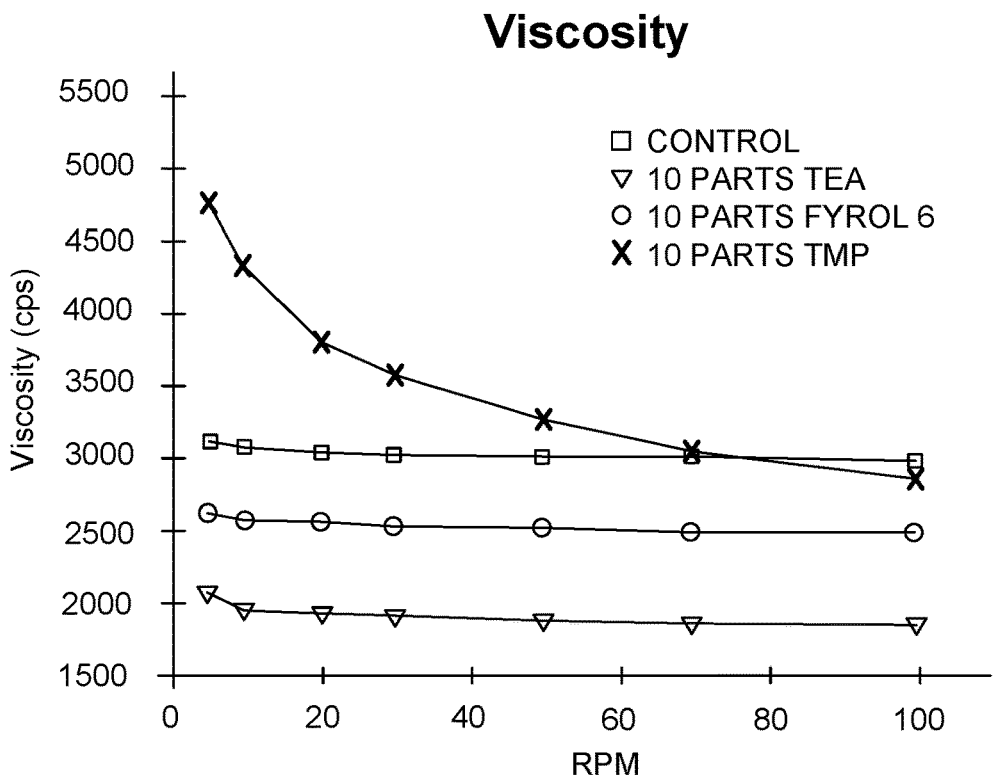
FIG. 23 illustrates viscosity data for various polyol formulations, excluding any blowing agent, in accordance with embodiments of the invention.

FIG. 23 illustrates the viscosity data of Table 20 graphically.

Cell Size

It has been observed that PIR foams having good thermal performance also often have small cell sizes. The cell size may be affected by the particular additives and other components in the polyol mixture. For example, Table 21 below gives performance data for a control formulation without additives, and two PIR formulations with additives that improve the thermal performance. Other than the variables shown, the formulations were processed similarly. The control formulation in Table 21 was not the same as the control formulation that appears in the tables above. The samples in Table 21 were fabricated using formulations mixed on a Hennecke Pentamat 10 premixing station.

TABLE 21

| Example Number | R/in. at 25° F. | R/in. at 40° F. | R/in. at 50° F. | R/in. at 60° F. | R/in. at 65° F. | R/in. at 75° F. | Density (lb/ft³) |
|---|---|---|---|---|---|---|---|
| Control Cell size 169 µm | 5.522 | 5.872 | 6.163 | 6.237 | 6.256 | 6.115 | 1.68 |
| 32 10 parts TEA HT5503 polyol Cell size 143 µm | 6.505 | 6.799 | 6.817 | 6.697 | 6.611 | 6.395 | 1.59 |
| 33 10 parts TEA PS 2352 polypol Cell size 135 µm | 6.711 | 6.932 | 6.922 | 6.784 | 6.689 | 6.647 | 1.63 |

Figure 24:
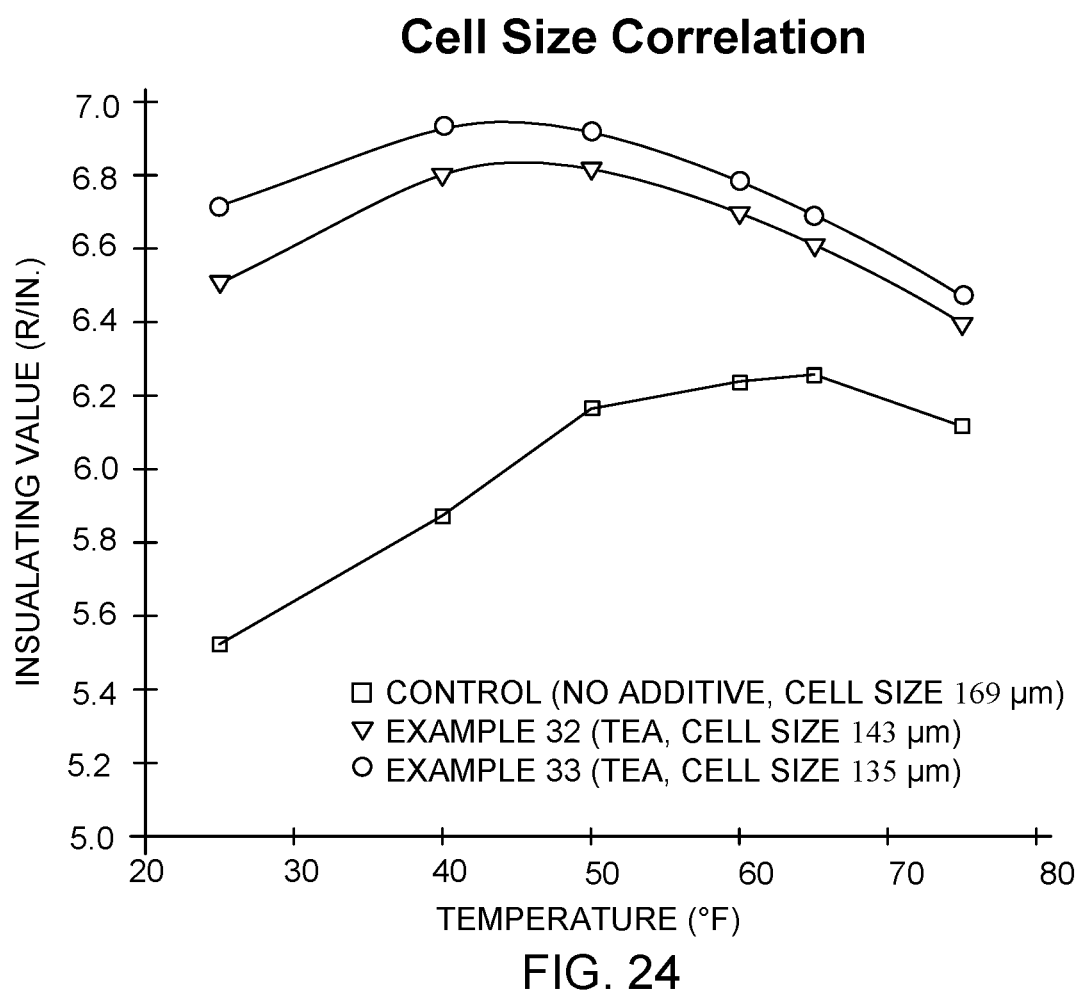
FIG. 24 illustrates a correlation of cell size with thermal performance of polyisocyanurate boards, in accordance with embodiments of the invention.

FIG. 24 illustrates the data of Table 21 graphically. As is apparent in Table 21 and FIG. 24, smaller cell size correlates with improved thermal performance.

All patents, patent publications, patent applications, journal articles, books, technical references, and the like discussed in the instant disclosure are incorporated herein by reference in their entirety for all purposes.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polyisocyanurate foam insulation product produced from:
   an isocyanate component; and
   a polyol-containing component including a blowing agent, one or more polyester polyols, a fire retardant, and one or more hydroxyl-containing low-molecular-weight additives selected from a group consisting of: triethanolamine (TEA), trimethylolpropane (TMP), diethyl bis(2-hydroxyethyl)aminomethylphosphonate (DEHAMP), N-methyldiethanolamine (MDEA), 1,4 butanediol (BD), isobutanol, diethylethanolamine (DEEA), and a multi-functional alcohol, wherein:
   the one or more hydroxyl-containing low-molecular weight additives is present in an amount of between 10 parts and 20 parts per 100 parts of the one or more polyester polyols;
   the polyisocyanurate foam insulation product has an R-value per inch of at least 6.0 when measured at 40° F.;
   the polyisocyanurate foam insulation product has a cell size of less than 200 microns;
   the polyol-containing component does not include any polyol that is not a polyester polyol or the one or more hydroxyl-containing low-molecular-weight additives; and
   the polyisocyanurate foam insulation product is an insulation board having at least one facer, the facer comprising fiberglass, foil, or paper.

2. The polyisocyanurate foam insulation product of claim 1, wherein the one or more hydroxyl-containing low-molecular-weight additives is effective to increase the R-value per inch of the insulation product as measured at 40° F., as compared with an otherwise-identical formulation lacking the one or more hydroxyl-containing low-molecular-weight additives.

3. The polyisocyanurate foam insulation product of claim 1, wherein the polyisocyanurate foam insulation product has an R-value per inch of at least 6.5 when measured at 40° F.

4. The polyisocyanurate foam insulation product of claim 1, wherein the polyisocyanurate foam insulation product has an R-value per inch of at least 5.5 when measured at 25° F.

5. The polyisocyanurate foam insulation product of claim 1, wherein the polyisocyanurate foam insulation product has an R-value per inch of at least 6.0 when measured at 25° F.

6. The polyisocyanurate foam insulation product of claim 1, wherein the one or more hydroxyl-containing low-molecular-weight additives has a molecular weight of between 50 and 500.

7. The polyisocyanurate foam insulation product of claim 6, wherein the one or more hydroxyl-containing low-molecular-weight additives has a molecular weight of between 50 and 300.

8. The polyisocyanurate foam insulation product of claim 1, wherein the one or more hydroxyl-containing low-molecular-weight additives is a multi-functional alcohol.

9. The polyisocyanurate foam insulation product of claim 8, wherein the multi-functional alcohol is selected from the group consisting of aliphatic, cycloaliphatic, aromatic, heterocyclic, and polyhydric alcohols and combinations thereof.

10. The polyisocyanurate foam insulation product of claim 1, wherein the one or more hydroxyl-containing low-molecular-weight additives comprises triethanolamine (TEA).

11. The polyisocyanurate foam insulation product of claim 1, wherein the one or more hydroxyl-containing low-molecular-weight additives comprises trimethylolpropane (TMP).

12. The polyisocyanurate foam insulation product of claim 1, wherein the one or more hydroxyl-containing low-molecular-weight additives comprises diethyl bis(2-hydroxyethyl)aminomethylphosphonate (DEHAMP).

13. The polyisocyanurate foam insulation product of claim 1, wherein the one or more hydroxyl-containing low-molecular-weight additives comprises N-methyldiethanolamine (MDEA).

14. The polyisocyanurate foam insulation product of claim 1, wherein the one or more hydroxyl-containing low-molecular-weight additives comprises 1,4 butanediol (BD).

15. The polyisocyanurate foam insulation product of claim 1, wherein the one or more hydroxyl-containing low-molecular-weight additives comprises isobutanol.

16. The polyisocyanurate foam insulation product of claim 1, wherein the one or more hydroxyl-containing low-molecular-weight additives comprises diethylethanolamine (DEEA).

17. The polyisocyanurate foam insulation product of claim 1, wherein the one or more hydroxyl-containing low-molecular-weight additives comprises triethanolamine (TEA) and trimethylolpropane (TMP).

18. The polyisocyanurate foam insulation product of claim 1, wherein the one or more hydroxyl-containing low-molecular-weight additives comprises triethanolamine (TEA) and sorbitol.

19. The polyisocyanurate foam insulation product of claim 1, wherein the fire retardant is non-halogenated.

20. The polyisocyanurate foam insulation product of claim 1, wherein the fire retardant comprises at least one fire retardant selected from the group of fire retardants consisting of diethyl hydroxymethyl phosphonate (DEHMP), and tris(2-chloroisopropyl)phosphate (TCPP).

21. The polyisocyanurate foam insulation product of claim 1, wherein the fire retardant comprises one or more compounds selected from the group of compounds consisting of an organo-phosphate, an organo-phosphite, and an organo-phosphonate.

22. The polyisocyanurate foam insulation product of claim 1, wherein the polyisocyanurate foam insulation product is a rigid foam having a density of between 1.45 and 25 lbs/ft$^3$.

23. The polyisocyanurate foam insulation product of claim 1, wherein the polyisocyanurate foam insulation product has a cell size of less than 150 microns.

24. The polyisocyanurate foam insulation product of claim 1, wherein the polyisocyanurate foam insulation product has a cell size of less than 120 microns.

25. The polyisocyanurate foam insulation product of claim 1, wherein the polyol-containing component has, before the addition of the blowing agent, a viscosity of less than 3000 centipoise (cps).

26. The polyisocyanurate foam insulation product of claim 1, wherein the polyol-containing component has, before the addition of the blowing agent, a viscosity of less than 2800 centipoise (cps).

27. The polyisocyanurate foam insulation product of claim 1, wherein the polyol-containing component has, before the addition of the blowing agent, a viscosity of less than 2500 centipoise (cps).

28. The polyisocyanurate foam insulation product of claim 1, wherein the polyol-containing component has, before the addition of the blowing agent, a viscosity of less than 2000 centipoise (cps).

29. The polyisocyanurate foam insulation product of claim 1, wherein at least one of the one or more polyester polyols has a hydroxyl number between 25 and 500.

30. The polyisocyanurate foam insulation product of claim 1, wherein the blowing agent comprises a mixture of n-pentane and isopentane.

31. The polyisocyanurate foam insulation product of claim 30, wherein the blowing agent comprises water in an amount between 0.1 and 1.0 weight percent of the polyol-containing component.

32. The polyisocyanurate foam insulation product of claim 1, further comprising a catalyst and a surfactant.

33. The polyisocyanurate foam insulation product of claim 1, wherein the polyol-containing component comprises a polyol having a functionality of greater than 2.0.

34. The polyisocyanurate foam insulation product of claim 33, wherein the one or more hydroxyl-containing low-molecular-weight additives comprises triethanolamine (TEA).

35. The polyisocyanurate foam insulation product of claim 33, wherein the one or more hydroxyl-containing low-molecular-weight additives comprises one or more additives selected from the group consisting of trimethylolpropane (TMP), diethyl bis(2-hydroxyethyl)aminomethylphosphonate (DEHAMP), N-methyldiethanolamine (MDEA), 1,4 butanediol (BD), isobutanol, and diethylethanolamine (DEEA).

36. The polyisocyanurate foam insulation product of claim 33, wherein the one or more hydroxyl-containing low-molecular-weight additives comprises triethanolamine (TEA), and the hydroxyl-containing low-molecular-weight additive comprises trimethylolpropane (TMP) or sorbitol.

37. The polyisocyanurate foam insulation product of claim 1, wherein the polyol-containing component comprises a polyol having a functionality of at least 2.45.

38. The polyisocyanurate foam insulation product of claim 1, wherein the polyol-containing component comprises a polyol having a functionality of between 2.0 and 2.45.

39. The polyisocyanurate foam insulation product of claim 1, wherein the polyol-containing component comprises two polyols, at least one of which has a functionality of greater than 2.0.

40. The polyisocyanurate foam insulation product of claim 1, wherein the polyol-containing component comprises two polyols, both of which have functionalities of at least 2.0.

\* \* \* \* \*